(12) United States Patent
BaderEddin

(10) Patent No.: US 10,776,801 B2
(45) Date of Patent: Sep. 15, 2020

(54) DISTRIBUTING ELECTRONIC SURVEYS VIA THIRD-PARTY CONTENT

(71) Applicant: QUALTRICS, LLC, Provo, UT (US)

(72) Inventor: Ali BaderEddin, Kenmore, WA (US)

(73) Assignee: QUALTRICS, LLC, Provo, UT (US)

(*) Notice: Subject to any disclaimer, the term of this patent is extended or adjusted under 35 U.S.C. 154(b) by 360 days.

(21) Appl. No.: 15/641,569

(22) Filed: Jul. 5, 2017

(65) Prior Publication Data
US 2019/0012685 A1   Jan. 10, 2019

(51) Int. Cl.
| | |
|---|---|
| *G06Q 30/02* | (2012.01) |
| *G06F 3/0481* | (2013.01) |
| *G06F 16/93* | (2019.01) |
| *G06Q 10/10* | (2012.01) |
| *G06F 16/35* | (2019.01) |
| *G06F 16/28* | (2019.01) |
| *G06F 17/00* | (2019.01) |

(52) U.S. Cl.
CPC ....... *G06Q 30/0203* (2013.01); *G06F 3/0481* (2013.01); *G06F 16/285* (2019.01); *G06F 16/353* (2019.01); *G06F 16/93* (2019.01); *G06Q 10/10* (2013.01); *G06Q 30/02* (2013.01); *G06Q 30/0201* (2013.01)

(58) Field of Classification Search
CPC ...... G06F 16/285; G06F 16/353; G06F 16/93; G06Q 30/02; G06Q 30/0203; G06Q 30/0201; G06Q 10/10
See application file for complete search history.

(56) References Cited

U.S. PATENT DOCUMENTS

| | | | |
|---|---|---|---|
| 2009/0241028 A1* | 9/2009 | Iskedjian | G06Q 10/10 715/727 |
| 2016/0196565 A1* | 7/2016 | Bibas | G06F 16/958 705/7.32 |
| 2016/0350771 A1* | 12/2016 | Gardner | G06Q 30/0203 |

* cited by examiner

*Primary Examiner* — Quoc A Tran
(74) *Attorney, Agent, or Firm* — Keller Jolley Preece

(57) ABSTRACT

Embodiments of the present disclosure relate to administration of an electronic survey via third-party content. For example, an electronic survey system receives a request to provide an electronic survey within a survey placeholder of a third-party webpage provided to a client device associated with a respondent. The survey system determines characteristics of the webpage or the respondent. The survey system then selects an electronic survey by comparing the characteristics of available electronic surveys to the characteristics of the webpage or the respondent. Additionally, the survey system provides electronic questions from the selected electronic survey for display within the survey placeholder of the webpage. The survey system also administers the electronic survey within the survey placeholder without redirecting the respondent client device away from the third-party webpage.

20 Claims, 21 Drawing Sheets

Fig. 3C

DISTRIBUTING ELECTRONIC SURVEYS VIA THIRD-PARTY CONTENT

BACKGROUND

Surveys often provide valuable information to entities about the interests of people, such as customers or another target audience. By reaching a broad audience of potential respondents, entities can more accurately determine potential audience interests. For instance, an entity (e.g., a commercial brand) can use electronic surveys to gauge the interest in a specific topic from a broad user base instead of relying on a more limited pool of respondents from surveys administered in-person or over the phone. Thus, reaching a broader pool of respondents allows entities to make more informed decisions.

Because survey response data becomes more useful when increasing the number of responses, survey administrators typically attempt to reach the greatest number of target respondents as possible. Some conventional electronic survey systems increase the pool of potential respondents by allowing an entity to provide electronic surveys within its own websites. For example, conventional electronic survey systems provide tools for a survey administrator of an entity to embed a survey within the entity's own website (e.g., as a popup overlay on the entity's webpage). As such, an entity can provide electronic surveys to those users who visit the entity's own website.

Some conventional systems also allow entities to distribute electronic surveys to potential respondents through various electronic communication methods. Some conventional systems, for instance, allow an entity to distribute an electronic survey to potential respondents via email or a dedicated survey webpage. For example, the conventional systems can host an electronic survey and disseminate links to the electronic survey via email.

While conventional electronic survey systems provide various methods of distributing surveys to potential respondents, the conventional systems are still limited to a relatively small pool of potential respondents. Specifically, the conventional systems that allow entities to distribute electronic surveys on their own websites are limited to only those users who visit their websites. Similarly, conventional systems that distribute electronic surveys via email or other similar means are limited to email address lists (e.g., past customers of the entity). Thus, conventional systems often fail to reach a broad pool of respondents, and in particular, conventional systems often cannot distribute electronic surveys to respondents with whom the entity does not already have at least a minimal relationship (e.g., a visitor of the entity's webpage or a previous customer).

Therefore, conventional electronic survey systems lack the technology to facilitate distribution of electronic survey systems through digital communication channels that reach a larger audience of potential respondents unconnected with an entity administering the electronic survey. Specifically, conventional systems are unable to digitally package an electronic survey in a way to distribute an electronic survey to an anonymous respondent audience via a digital communication channel. Moreover, conventional systems often lack the ability to interface with digital communication channels outside of email or popup surveys on an entities own website. Due to these and other technological shortcomings, conventional electronic survey systems fail to capture a complete understanding from a diverse and comprehensive respondent audience.

Accordingly, these and other disadvantages exist with respect to conventional systems and methods for distributing electronic surveys.

SUMMARY

Embodiments of the present disclosure provide benefits and/or solve one or more of the foregoing or other problems in the art with systems and methods for distributing electronic surveys to a broad respondent pool. Specifically, the systems and methods provide distribution of electronic surveys to potential respondents via third-party content providers (e.g., entities other than the entity associated with the electronic survey). For example, the systems and methods package and distribute an electronic survey using a digital communication channels associated with third-party content providers. Moreover, the systems and methods interface with the third-party content providers to provide an electronic survey that is relevant to the potential respondent interacting with the third-party content. Thus, the systems and methods allow an entity to create an electronic survey for administration to a broad pool of potential respondents with whom the entity may not have any relationship.

The systems and methods determine one or more characteristics of an electronic survey based on the content of the electronic survey or information provided by a survey administrator. In some embodiments, the systems and methods provide a survey placeholder within third-party content, where the third-party content is associated with computer executable instructions to request an electronic survey. In response to a request to provide an electronic survey within a survey placeholder within the third-party content, the systems and methods compare the characteristic(s) of the electronic survey to characteristic(s) of the third-party content and/or characteristics of a potential respondent interacting with the third-party content. Based on the comparison, the systems and methods select the most relevant electronic survey from among multiple electronic surveys and provide an electronic survey question from the selected electronic survey to within the survey placeholder.

Additional features and advantages of the embodiments will be set forth in the description that follows, and in part will be obvious from the description, or may be learned by the practice of such exemplary embodiments. The features and advantages of such embodiments may be realized and obtained by means of the instruments and combinations particularly pointed out in the appended claims. These, and other features, will become more fully apparent from the following description and appended claims, or may be learned by the practice of such exemplary embodiments as set forth hereinafter.

BRIEF DESCRIPTION OF THE DRAWINGS

In order to describe the manner in which the above recited and other advantages and features of the disclosure can be obtained, a more particular description of the disclosure briefly described above will be rendered by reference to specific embodiments thereof that are illustrated in the appended drawings. It should be noted that the figures are not drawn to scale, and that elements of similar structure or function are generally represented by like reference numerals for illustrative purposes throughout the figures. Understanding that these drawings depict only typical embodiments of the disclosure and are not therefore considered to be limiting of its scope, the disclosure will be described and explained with additional specificity and detail through the use of the accompanying drawings, in which:

FIGS. 3A-3C illustrate example graphical user interfaces for creating and distributing an electronic survey in accordance with one or more embodiments;

DETAILED DESCRIPTION

Figure 1:
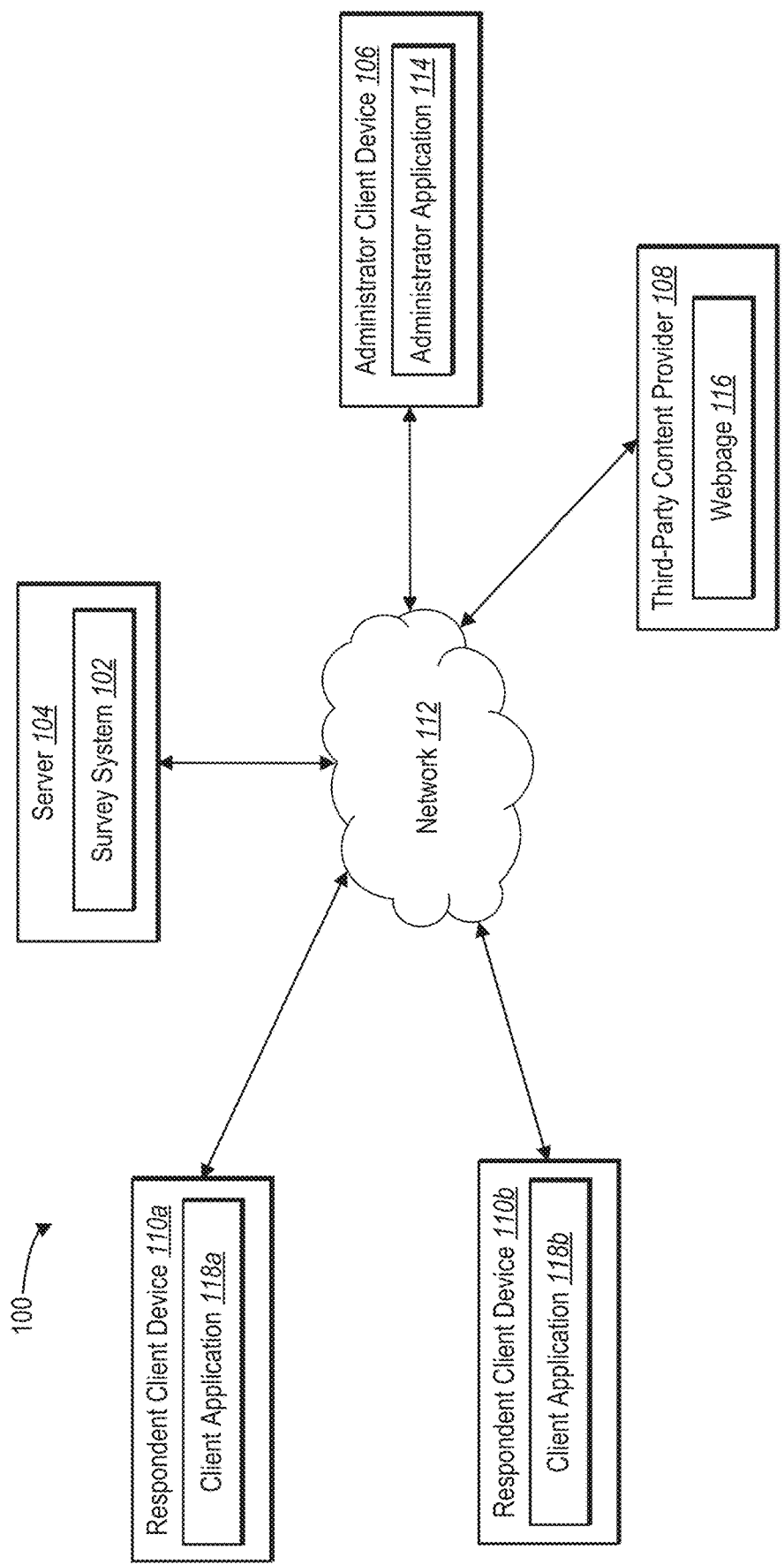
FIG. 1 illustrates a block diagram of an environment in which a survey system operates in accordance with one or more embodiments.

One or more embodiments disclosed herein provide a survey system that distributes electronic surveys via third-party content provided by third-party content providers (e.g., third-party webpages). In one or more embodiments, the survey system allows a survey administrator associated with an entity to create electronic surveys for distribution to potential respondents via third-party webpages. Specifically, the survey system matches an electronic survey from among multiple electronic surveys (e.g., created by the same entity or multiple different entities) to third-party webpages and/or potential respondents based on common characteristics between the electronic survey and the webpages and/or potential respondents. Additionally, the survey system provides an electronic survey question(s) from the selected electronic survey to insert into a survey placeholder within the third-party webpage. Thus, the survey system enables an entity to expand the pool of potential respondents for electronic surveys by distributing electronic surveys within third-party websites, while at the same time distributing electronic surveys to potential respondents that are likely interested in the electronic survey topic.

In one or more embodiments, the survey system determines characteristic(s) of an electronic survey in order to match an electronic survey to characteristics of websites and/or respondents. For instance, based on analyzing content of an electronic survey and/or information that the survey administrator provides, the survey system determines one or more characteristics of the electronic survey based on a theme or subject of one or more of the questions in the electronic survey. In another example, the survey system determines a characteristic of the electronic survey that describes potential respondents of the electronic survey. Additionally, an entity can set up an entity profile or survey profiles that provide general or specific information, respectively, about one or more electronic surveys created by the entity.

The survey system maintains the electronic survey in a survey repository with other electronic surveys from various entities for distributing to a plurality of different third-party content providers. The survey system facilitates the embedding of executable code within third-party content that creates a survey placeholder within the third-party content. Moreover, the executable code causes a client device accessing the third-party content to request an electronic survey from the survey system. When the survey system receives a request from a client device to provide an electronic survey within a survey placeholder of third-party content, the survey system determines characteristic(s) of the third-party content and/or of a user of the client device. The survey system then selects an electronic survey from the survey repository based on the characteristic(s) of the survey corresponding to the characteristic(s) of the third-party content and/or respondent.

In one or more embodiments, after selecting an electronic survey based on common characteristics of the electronic survey and the third-party content/respondent, the survey system provides at least one question from the electronic survey to the client device for display within the survey placeholder. The survey system can determine display characteristics (e.g., size, shape) of the survey placeholder within the third-party content, and then customize the number and format of questions from the electronic survey according to the display characteristics. For instance, the survey system determines whether to display one question or more than one question from the electronic survey at a time within the survey placeholder. Additionally, the survey system determines how to visually format the question(s) so that the questions and/or answer choices have intuitive and inviting presentation aesthetic within the survey placeholder.

In addition to providing a survey question from an electronic survey in a survey placeholder within the third-party content, the survey system can administer an entire electronic survey within the survey placeholder. For example, a client device of a respondent can detect a selected response by the respondent and then send the response information and/or an indication of the response to the survey system. If the electronic survey includes additional questions, the survey system can provide the additional questions (e.g., one or more at a time) to the client device for display within the survey placeholder until the respondent finishes or otherwise terminates the electronic survey. The survey system can store the response information and generate survey results and/or result reports to provide to a survey administrator.

The survey system provides various advantages over the conventional systems. For example, the survey system interfaces with third-party content to communicate electronic surveys to potential respondents. Unlike conventional systems that rely on communication channels directly connected to a known respondent (e.g., visitor of the surveying entities website, or email from the surveying entities customer list), the survey system uniquely overcomes technical hurdles that allow the survey system to distribute and administer electronic surveys via third-party content communication channels that are disconnected from the surveying entity. Distributing and administering electronic surveys via third-party content communication channels expands the pool of potential respondents for electronic surveys beyond conventionally available distribution methods.

The survey system includes various technological advances that enable the distribution and administration of electronic surveys via a third-party communication channel. For example, in some embodiments, the survey system allows for the dynamic creation of a survey placeholder within third-party content that allows a client device to request and present electronic surveys in conjunction with third-party content. For instance, and unlike conventional system, the survey system does not require that the third-party content providers embed or encode the electronic surveys as part of the third-party content creation process, but rather allows third-party providers to easily and efficiently incorporate a survey placeholder within content.

Similarly, the survey system allows for the administration of electronic surveys without redirecting users to a website associated with the survey system or the surveying entity. In particular, the survey system is able to customize the graphical format of electronic survey questions to for presentation within survey placeholders according to display characteristics of the survey placeholders. The survey system also establishes a digital communication channel between the third-party content system and the survey system to allow the third-party content system to provide responses to electronic survey questions, and to receive additional electronic survey questions from the survey system based on user interactions with an electronic survey question within the survey placeholder. As such, the survey system can administer electronic surveys created by a plurality of entities to a variety of third-party content providers that have differing user experiences and display requirements within their respective content (e.g., webpages).

As used herein, the term "electronic survey question," "survey question," or simply "question" refer to an electronic communication used to collect information. For example, a survey question is an electronic communication that causes a client device to present a digital prompt that invokes or otherwise invites a response interaction from a user of the client device (e.g., a respondent). A survey question can include one of many different types of question formats, including, but not limited to, perception, multiple choice, open-ended, ranking, scoring, summation, demographic, dichotomous, differential, cumulative, dropdown, matrix, net promoter score (NPS), single textbox, heat map, and any other type of question format that can invoke a response from a respondent.

In addition, a survey question can include a question portion as well as an available answer portion that corresponds to the survey question. For example, an electronic survey question can include a question portion that a client device presents within a graphical user interface, and an available answer portion with which a respondent can interact within the graphical user interface (e.g., using a mouse, touch screen, or another user input device). For instance, an available answer portion can include one or more selectable elements each associated with an answer choice, a text input area within which a user can provide text input, or an interaction element (e.g., slider bar) with which a user can interact to provide a response to a question portion of a survey question.

As used herein, the terms "electronic survey" or simply "survey" refer to a digital organization of one or more electronic survey questions. In one or more embodiments, an electronic survey is a digital file or files on a survey database that facilitate the distribution, administration, and collection of responses of one or more survey questions associated with the electronic survey. Moreover, an electronic survey as used herein may generally refer to a method of requesting and collecting electronic data from respondents via an electronic communication distribution channel. In some embodiments, an electronic survey comprises electronic data in a survey system format, and the survey system can convert the electronic data from the survey system format to a format related to a specific communication distribution channel.

In addition, an electronic survey can refer to a set of executable instructions that cause a survey system to distribute electronic survey questions to one or more client devices corresponding to one or more respondents. Furthermore, an electronic survey can include attributes and settings that dictate the presentation of survey questions, such as an order of survey questions, the layout of survey questions, and/or a survey question decision tree that determines whether and/or when to provide a specific survey question based on one or more factors (e.g., a previous user response and/or respondent characteristics). An electronic survey can be organized to administer survey questions in various electronic survey forms, such as a poll, questionnaire, census, or other type of sampling.

As used herein, the term "response" refers to electronic data provided in response to an electronic survey question. The electronic data may include content and/or feedback based on user input from the respondent in response to a survey question. Depending on the survey question type, the response may include, but is not limited to, a selection, a text input, an indication of an answer selection, a user provided answer, and/or an attachment. For example, a response to a multiple-choice survey question can include a single data point that indicates a selection of one answer from a plurality of possible answers in the multiple-choice survey question.

As used herein, the term "respondent" refers to a person or entity that participates in, and responds to, a survey question. Also, as used herein, the term "administrator" refers to a person or entity that creates and electronic survey for administration to one or more respondents. As used herein, the term "third-party content provider" refers to an entity that creates and/or provides content (e.g., within a website) accessible to respondents via the Internet or another network. A third-party content provider is a separate entity from the survey system provider and an entity corresponding to an administrator. In other words, a third-party content provider is not the survey system provider, and the third-party content provider is not associated with the survey administrator.

As used herein, the term "third-party content" refers to digital content provided to users (e.g., respondents) by the third-party content provider. Examples of third-party content include websites, webpages, digital media (e.g., digital video), social media content, or other forms of digital content. Although third-party content can refer to various forms of digital content, for explanation purposes, this disclosure describes the functions and features of the survey system primarily with respect to third-party websites and webpages.

FIG. 1 illustrates an environment 100 in which a survey system 102 operates. The description associated with FIG. 1 provides an overview of the environment 100 that includes the survey system 102. A more detailed description of the components and processes of the survey system 102 are provided in relation to the remaining figures.

Specifically, FIG. 1 illustrates a server 104, an administrator client device 106, a third-party content provider 108, and a plurality of respondent client devices 110a, 110b (generally referred to as client device(s) 110). Additionally, each of the administrator client device 106 and respondent client devices 110a, 110b may be associated with users (e.g., an administrator and a plurality of respondents, respectively). Each of the devices in the environment 100 of FIG. 1 can communicate with one or more other devices. For example, the server 104 can communicate with the administrator client device 106, the third-party content provider 108, and the respondent client devices 110 over a network 112. As described in greater detail below, the server 104 can perform or provide functions and processes of the methods and systems described herein. Additionally, the administrator client device 106 and/or the respondent client devices 110 can perform or provide at least some of the functions and processes of the methods and systems described herein.

According to one or more embodiments, the server 104 includes the survey system 102 that facilitates the creation, administration, response collection, and response analysis of electronic surveys. In one example, the server 104 is a single server computing device. Alternatively, the server 104 includes a plurality of server computing devices, such as a plurality of server computing devices connected via a network 112. Thus, the survey system 102 runs on one or more server computing devices to allow administrators to create and manage surveys on the server computing device(s) and to administer the surveys to a plurality of respondents.

In one or more embodiments, the administrator client device 106 and the respondent client devices 110 can be any type of computing devices that allow the administrator and respondents, respectively, to perform operations associated with creating, administering, viewing results, and/or otherwise interacting with electronic surveys. For example, the computing devices can include mobile devices (e.g., smartphones, tablets, laptops, wearable devices), desktop devices, or other types of devices. Furthermore, the administrator and respondents can create, administer, or otherwise interact with electronic surveys by way of various input devices, including a mouse, a touchscreen, sensors, cameras, or other input devices. Additional details with respect to computing devices are discussed below with respect to FIGS. 10 and 11.

The survey system 102 allows an administrator associated with an entity to create electronic surveys to administer to a plurality of respondents via websites, for example, of one or more third-party content providers. In particular, the survey system 102 administers an electronic survey created based on information the administrator client device 106 provides to the survey system 102. For instance, the administrator client device 106 can communicate with the server 104 to allow the administrator to create an electronic survey by interacting with a survey creation interface (e.g., a web interface) within an administrator application 114 of the administrator client device 106. To illustrate, the administrator can create one or more survey questions for the survey using an administrator application 114 (e.g., a web browser) on the administrator client device 106 to access the server 104 hosting the survey system 102. The administrator client device 106 can send information from inputs related to an electronic survey (e.g., survey question content and type) to the server 104 for the survey system 102 to create and administer the electronic survey to the plurality of respondent client devices 110a, 110b.

The survey system 102 administers electronic surveys by sending data related to the electronic surveys to the respondent client devices 110. For example, the survey system 102 can communicate with the respondent client devices 110 to provide electronic survey questions in response to requests by the respondent client devices 110 to provide the electronic survey to the respondent client devices 110. Although FIG. 1 illustrates only two respondent client devices 110a and 110b, it is understood that the survey system 102 can provide electronic surveys, and receive response data from, any number of respondent client devices.

To illustrate, the respondent client device 110a can request an electronic survey in response to accessing a third-party webpage 116 using a client application 116a. For example, the client applications 116a, 116b can include a web browser application, a dedicated third-party provider application, a native application capable of providing third-party content, or other similar application that facilitates receiving and presenting third-party content. In some embodiments, for example, the third-party content provider 108 can include code within the webpage 116 that causes the respondent client device 110 to request an electronic survey from the survey system 102 upon the client application 116 rendering the webpage 116.

In response to requests from the respondent client devices 110 for electronic surveys, the survey system 102 selects electronic surveys from a set of available electronic surveys. In particular, the survey system 102 selects an electronic survey in response to a request by determining that characteristics of an electronic survey correspond to characteristics of the corresponding webpage and/or respondent accessing the webpage. For example, a request from a client device 110 can include information about the webpage and/or the respondent associated with the client device 110 that allows the survey system 102 to select a relevant electronic survey from the available electronic surveys. The third-party content providers can also provide information to the survey system 102 prior to, or included in, the request from the respondent client device.

When administering an electronic survey to a respondent client device 110 via third-party content, the survey system 102 sends one or more electronic survey questions from the selected electronic survey to the respondent client device 110 for display within a survey placeholder within the third-party content (e.g., webpage 116). As used herein, the terms "survey placeholder" or "placeholder" refer to a designated graphical area within third-party content for presenting one or more electronic survey questions. For example, a survey placeholder can include a designated graphical area within a webpage for displaying an electronic survey question. In particular, a survey placeholder can include a predetermined section within the webpage, as designated within the webpage markup language, that provides a place for inserting an electronic survey question and/or administering an electronic survey (e.g., presenting a series of electronic survey questions).

In one or more embodiments, the survey system 102 determines display characteristics associated with a survey placeholder within the third-party content (e.g., webpage 116). Based on the display characteristics of a survey placeholder, the survey system can format a survey question for optimal presentation within the survey placeholder. For example, the survey system 102 can determine how many electronic survey questions to provide to client device 110 for presentation within the survey placeholder, and the format of an electronic survey questions (e.g., answer selection options, font size, question format, etc.).

After receiving an electronic survey question from the survey system 102, the respondent client device 110 can present the electronic survey question within the survey placeholder within the third-party content, such as a third-party webpage presented within client application 118. Specifically, a respondent interacts with the survey question within a graphical user interface that the client application 118 provides. The respondent client device detects a respondent's interactions with the survey question, and in response collects or otherwise generates response data. The client device 110 can send the collected response data to the survey system 102 on the server 104, and the survey system associates the response data with the appropriate electronic survey and survey question (e.g., within an electronic survey database).

After receiving survey response data from the respondent client devices 110a, 110b, the survey system 102 may provide and additional survey question to the client device for presentation in the survey placeholder within the third-party content. Additionally, the survey system 102 can access survey response data received from multiple respondents to generate survey result reports. The server 104 can send the survey result reports to the administrator client device 106 for the administrator to view and/or to another client device associated with the entity for a marketer or another user to view.

Although FIG. 1 illustrates a particular arrangement of the administrator client device 106, server 104, third-party content provider 108, respondent client devices 110a, 110b, and network 112, various additional arrangements are possible. For example, the administrator client device 106 may directly communicate with the server 104 hosting the survey system 102, thus bypassing the network 112. Further, while only one administrator client device 106 and two respondent client devices 110a, 110b are illustrated, the environment 100 can include any number of administrator client devices (and corresponding entities) and respondent client devices (and corresponding users). Additionally, the environment 100 can include any number of third-party content providers that provide third-party content to respondent client devices 110a and 110b.

Figure 2A:
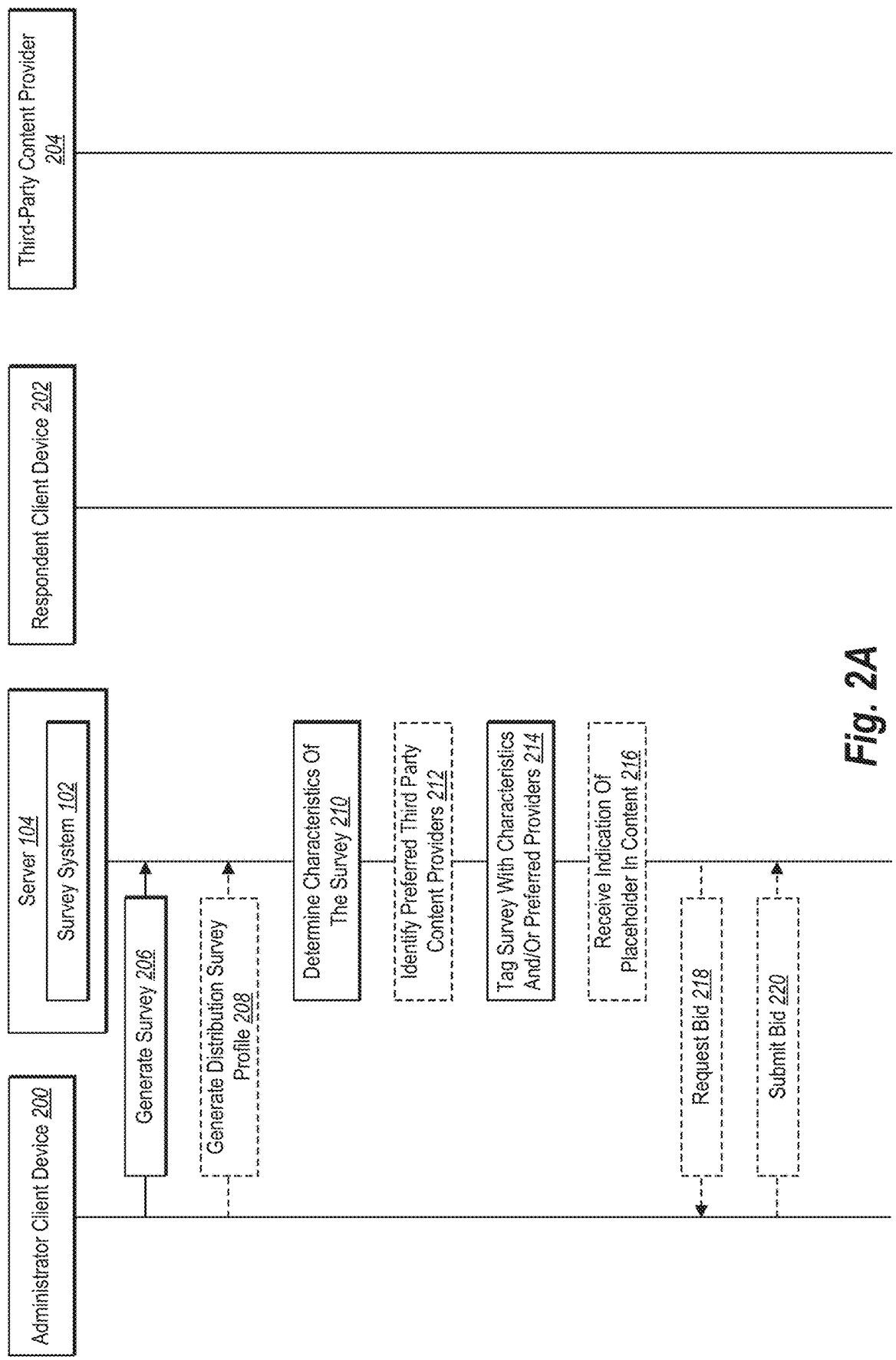
FIGS. 2A-2C illustrate a sequence-flow diagram for creating electronic surveys, distributing electronic surveys, and administering electronic surveys within third-party content in accordance with one or more embodiments.
Figure 2B:
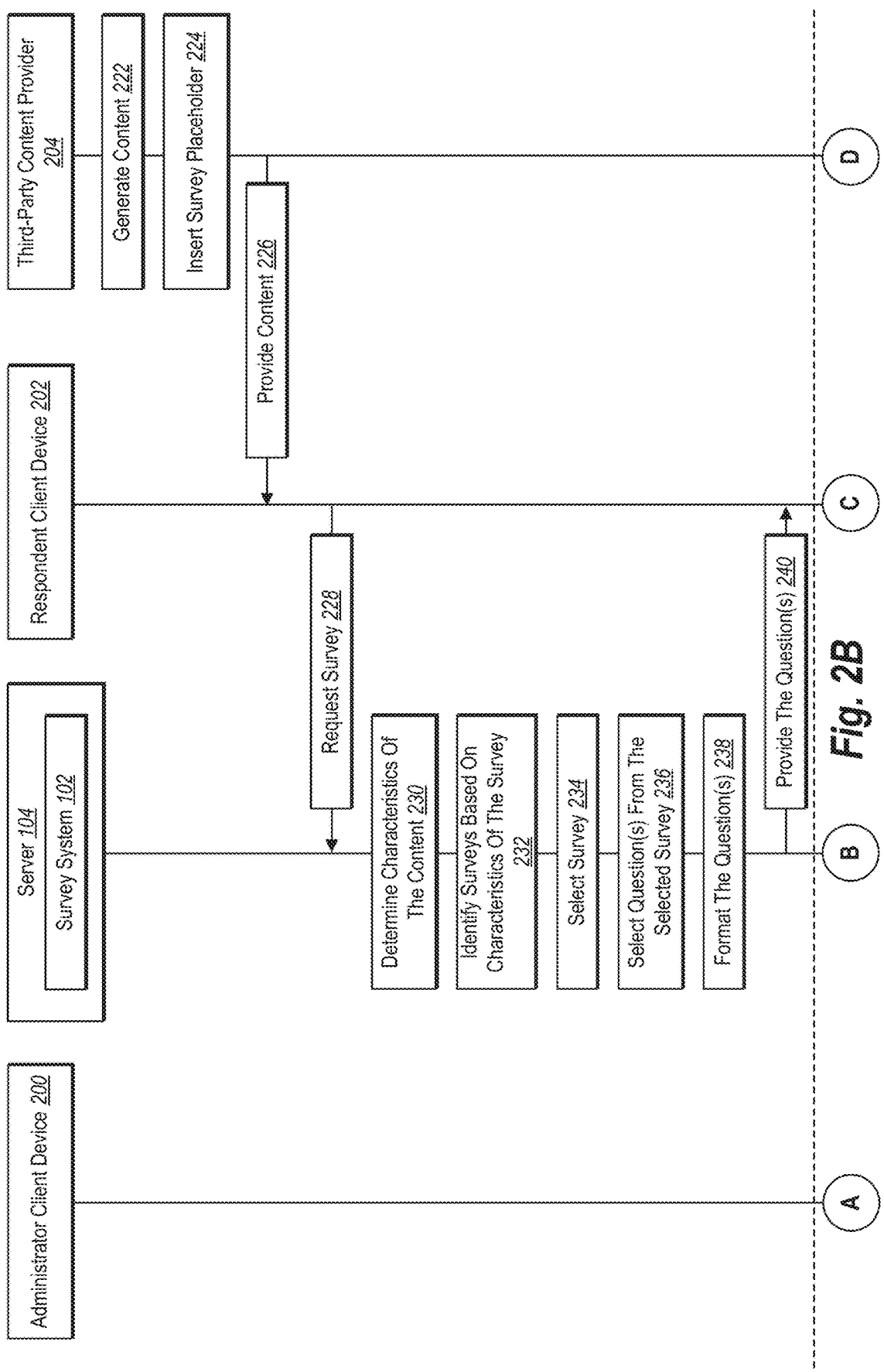
Figure 2C:
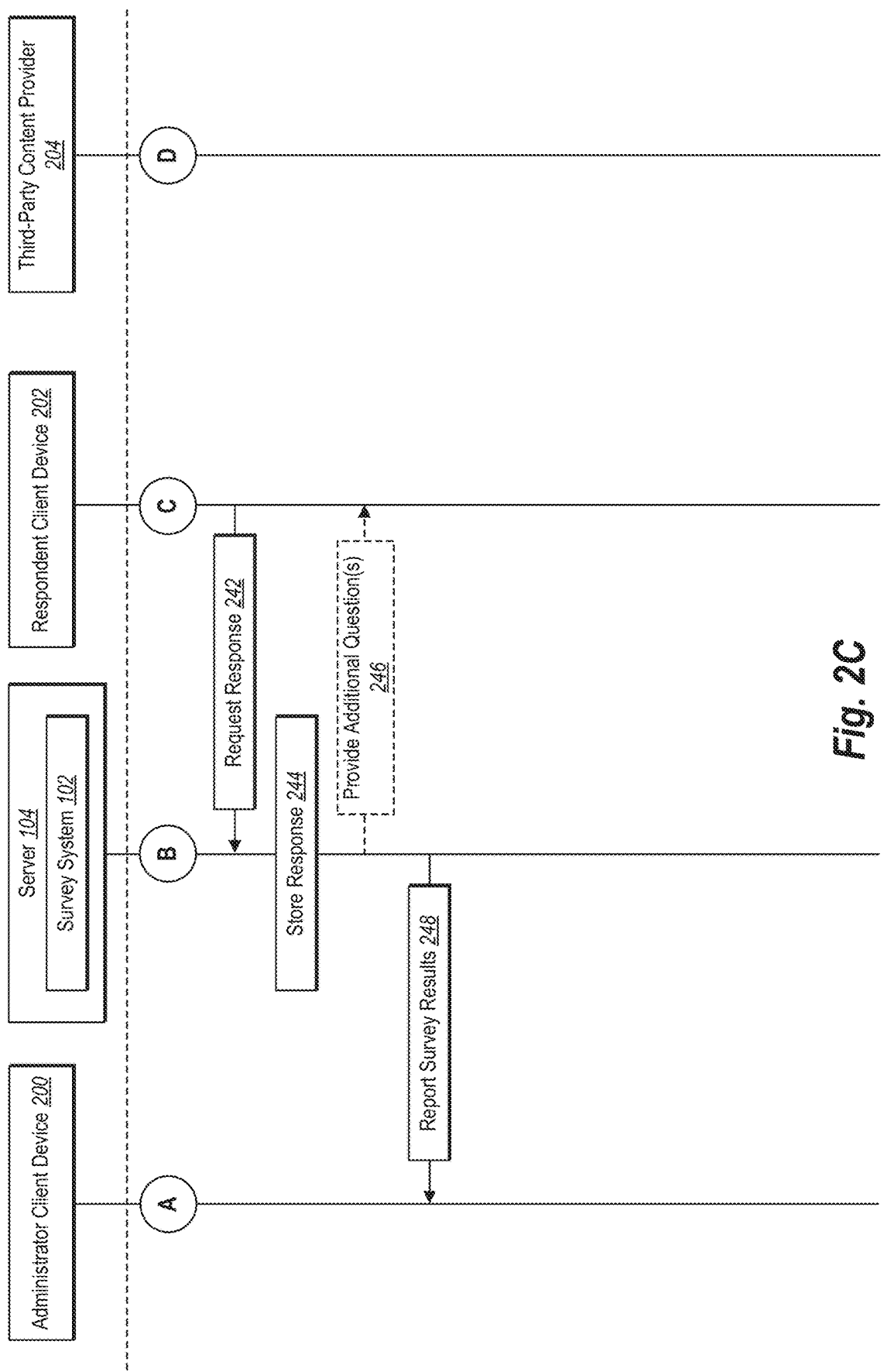

FIGS. 2A-2C illustrate a sequence-flow diagram for creating, distributing, and administering electronic surveys to potential respondents via third-party content, for example, a third-party webpage. In particular, the process diagram includes an administrator client device 200, the survey system 102 on the server 104, a respondent client device 202, and a third-party content provider 204. The administrator client device 200, the survey system 102 on the server 104, the respondent client device 202, and the third-party content provider 204 shown in FIGS. 2A-2C may be examples of the respective devices and systems discussed above with respect to FIG. 1.

As illustrated in FIG. 2A, an administrator can create a survey to be distributed to a respondent via third-party content. In one or more embodiments, as illustrated in FIG. 2A, a process for a survey administrator (or simply "administrator") creating an electronic survey includes the administrator using the administrator client device 200 to access the survey system 102 to create an electronic survey 206. Specifically, the administrator can create the survey by an application on the administrator client device 200 to access the survey system 102 and create one or more survey questions (e.g., a web browser to access a web application provided by the survey system 102. The administrator can create the survey question(s) by selecting question types, selecting answer types, inputting text, images, or other content for use within a survey question. After the administrator generates the survey, the survey system 102 stores the survey in a survey repository, where the survey repository can maintain multipole surveys associated with one or more entities.

Optionally, the administrator can also generate a survey distribution profile 208 that indicates one or more characteristics of the survey. For example, a survey distribution profile can include a targeted demographic (e.g., age group, gender, geographical location, occupation) associated with the survey. The survey distribution profile can also include one or more preferred third-party content providers for distributing the survey. For example, the survey distribution profile can include specific third-party content providers (e.g., ESPN, QVC, NPR). Alternatively, or additionally, the survey distribution profile can include a category of third-party content providers (e.g., sports, shopping, news). The survey system 102 can store the survey distribution profile as a separate file corresponding to the survey or as metadata included in the survey. In at least some implementations, the administrator, or other user associated with an entity, also sets up an entity profile that indicates general preferences and/or characteristics of the entity for use in distributing electronic surveys associated with the entity.

In addition to a survey administrator providing input for a survey distribution profile, in one or more embodiments, the survey system 102 automatically determines characteristics of the survey 210. In particular, the survey system 102 can determine characteristics corresponding to a survey to use in identifying the survey for distribution via third-party content that relates to the characteristics of the survey. In some examples, the survey system 102 analyzes the survey questions within the survey (e.g., using natural language processing or other data processing techniques) to determine a theme, topic, or other content characteristic of the survey.

To illustrate, the survey system can use NPL techniques to detect that one or more survey questions includes the keywords "travel," "airline," and "hotel." For instance, the survey system can detect keywords throughout the entirety of an electronic survey, and then rank the detected keywords (e.g., based on frequency of use) to identify the most significant keywords. The survey system 102 can analyze keywords to identify a topic that relates to one or more of the keywords. In this example, the survey system 102 can determine that the keywords of "travel," "airline," and "hotel" are associated with the topic "vacation." Accordingly, and as will be discussed below, the survey system 102 can associate the topic of "vacation" with the electronic survey for the purpose of selecting or otherwise identifying the electronic survey for distribution within third-party content that relates to vacations or travel, or for distribution to a respondent interested in vacations or travel (e.g., based on a user profile of the respondent).

In one or more embodiments, determining characteristics of the survey optionally includes identifying third-party content providers based on determined characteristics of a survey. For example, the survey system can perform a search to identify one or more third-party content providers that relate to the survey characteristics. Accordingly, if the survey system 102 determines a survey corresponds to a specific characteristic, then the survey system 102 can search a third-party content provider database to identify third-party content providers that are also associated with the same or similar specific characteristic.

Additionally, determining characteristics of the survey can include identifying information within a distribution profile or entity profile that the administrator creates. For example, the survey system 102 can identify preferred third-party content providers 212 for distributing the survey within either the distribution profile or entity profile. Based on preferred third-party content providers, the survey system 102 can associate characteristics corresponding to the preferred third-content providers with the electronic survey.

To illustrate, if the survey system 102 identifies ESPN as a preferred third-party content provider, the survey system 102 can identify characteristics associated with ESPN either by looking up characteristics within a third-party content provider database, or by analyzing content from ESPN (e.g., the ESPN website) to determine keywords or topics that describe characteristics of ESPN. Accordingly, in this example, the survey system 102 can determine that ESPN corresponds to the characteristics of sports, 65% male viewers, 35% female viewers, geographic reach, etc. The survey system 102 then associates the identified characteristics of the preferred third-party content provider to the electronic survey.

In one or more examples, the survey system 102 can generate a preferred order of survey distribution based on a combination of the distribution/entity profile and characteristics assigned to the survey based on the survey system 102 analysis, as described above. For instance, the survey system 102 can prioritize distribution of the survey to preferred content providers first. The next prioritized level is based on identifying a third-party content provider (e.g., different from a preferred provider) that matches or relates to characteristics associated with the survey. Accordingly, the survey system 102 monitors requests for electronic surveys from client devices presenting third-party content, and determines whether to select an electronic survey based on the survey characteristics, preferred third-party content providers, and/or prioritization of one or more characteristics for the electronic survey.

Alternatively, a survey administrator can provide input that indicates a prioritization third-party content providers for survey distribution. For instance, an administrator can setup a preference that a survey is only distributed to preferred third-party content providers. As another example, the survey administrator can input a total number of surveys to distribute within a define time period (e.g., day, week, month). The survey system 102 can monitor the rate of distribution, and use the rate of distribution compared to the number of surveys per time period as an additional factor of determining whether or not to select the survey for distribution in response to a request from client device 202.

For example, if the rate of distribution is lower than the administrator's desired rate of distribution, the survey system 102 is less restrictive on matching the survey with third-party content, e.g., the survey system 102 may send the electronic survey in response to requests associated with non-preferred third-party content. On the other hand, if the rate of distribution is higher than the administrator's desired rate of distribution, the survey system 102 is more restrictive on matching the survey with third-party content, e.g., the survey system 102 may only send the electronic survey in response to requests associated with the highest prioritized preferred third-party content provider.

Nevertheless, based on determining or otherwise identifying third-party content providers and characteristics of an electronic survey, the survey system 102 tags the survey with the characteristics and/or the third-party content providers 214. In particular, the survey system 102 can store the characteristics and/or the preferred third-party content providers as metadata tags associated with a survey identifier for the survey. For example, the survey system 102 can maintain a database of survey characteristics and third-party content providers that are mapped to surveys stored in a survey repository based on a survey identifier. As will be described in more detail below, the database of characteristics allows the survey system 102 to distribute surveys to potential respondents who are most likely to be interested in the subject matter of the surveys or to a particular audience that the administrator explicitly targets.

In one or more embodiments, the survey system 102 optionally allows entities to enter bids to place surveys in available placeholders. For example, the survey system 102 can receive an indication of a survey placeholder in content 216 from a third-party content provider. The indication can include information about the third-party content provider, the content, and/or the survey placeholder. To illustrate, the information can indicate a theme or topic of the content, the identity of a third-party content provider, and display characteristics (e.g., dimensions) of the survey placeholder. The information can also include traffic for the third-party content (e.g., number of daily hits to a website of the third-party content provider).

The survey system 102 can then request a bid 218 from the administrator of the administrator client device 200. For example, the survey system 102 can send a request to the administrator client device 200 with the information provided in the received indication of the survey placeholder. The administrator can then determine whether, and how much, to bid to distribute the survey in the survey placeholder within the specified third-party content. The administrator can then cause the administrator client device 200 to submit a bid 220 to the survey system 102. In one or more embodiments, administrators submit bids for specific placeholders on a webpage. Alternatively, administrators can submit bids for placing surveys on a specific website or webpage without submitting bids for a specific placeholder. As described in more detail below, the survey system 102 can use bids to determine a priority or selection process for displaying candidate surveys in a survey placeholder on a webpage.

According to one or more embodiments, the bidding process allows administrators to submit bids based on a variety of criteria. For instance, an administrator can bid to insert surveys into a website until the survey achieves a threshold number of impressions, responses for one or more questions, or other measurable criteria associated with the survey. When a survey meets the selected criteria, the survey system may pull the survey from the pool of available surveys. The administrator may submit a new bit to place the survey back into the pool of available surveys. Alternatively, the administrator may create a new survey and then submit a bid for the new survey.

In one or more embodiments, after an administrator creates a survey, the survey system 102 can determines when, where, and how to distribute survey questions from a survey within third-party content. FIGS. 2B-2C illustrate a process for selecting and distributing an electronic survey to a respondent via third-party content. As illustrated, the third-party content provider 204 generates content 222 to provide to one or more potential respondents. For example, the third-party content provider can generate webpage content for a website hosted by the third-party content provider. The website may include any type of content and be accessible to potential respondents via the Internet or other network.

Additionally, the third-party content provider 204 inserts a survey placeholder 224 into webpage content. Specifically, while generating the content, the third-party content provider 204 can insert a portion of code (e.g., executable instructions) that creates a survey placeholder within the webpage. Additionally, the third-party content provider 204 can specify a size and location of the survey placeholder within the webpage, such that a survey that the survey system 102 selects for display within the survey placeholder appears in a specified size and location each time the webpage renders on the respondent client device 202.

The third-party content provider 204 can also insert code into the survey placeholder that causes a respondent client device to request a survey from the survey system 102. For instance, as mentioned, the code can include an application program interface ("API") call or function call (e.g., JavaScript call) including a request to the survey system 102 to provide a survey to the corresponding respondent client device. In one or more embodiments, the third-party content provider 204 obtains the code for inserting into the survey placeholder from an API associated with the survey system 102. The third-party content provider 204 can also input characteristics of the webpage or other information associated with the webpage content and/or the third-party content provider 204 into the code associated with the survey placeholder.

As FIG. 2B further illustrates, the third-party content provider 204 provides the content 226 to the respondent client device 202 in response to a request by the respondent client device 202 to access the content. In particular, the respondent client device 202 can request the content when a respondent associated with the respondent client device 202 accesses a location of the content via a network (e.g., a URL of the content). For example, a respondent associated with the respondent client device 202 can use a client application to access third-party content such as websites associated with various third-party content providers. When the respondent client device 202 requests webpage content from the third-party content provider 204 (e.g., within a web browser), the third-party content provider 204 can provide the content to the respondent client device 202 over a network connection.

After, or while, receiving content from the third-party content provider 204, the respondent client device 202 requests a survey 228 from the survey system 102, as shown in FIG. 2B. Specifically, the respondent client device 202 executes code within the third-party content that causes the respondent client device to request a survey from the survey system 102. For example, the third-part content can include one or more survey placeholders for providing surveys to the respondent. Each of the survey placeholders includes code that causes the respondent client device to communicate with the survey system 102 to request a survey for presentation within each of the survey placeholders.

The request for a survey can include additional information that allows the survey system 102 to select an appropriate survey for the survey placeholder. For instance, the request can include characteristics of the content (e.g., theme or subject matter) or characteristics of users who typically access the content (e.g., demographic information). Additionally, the request can include display characteristics for the survey placeholder, including the size (e.g., height/width dimensions), shape, and location relative to other content. The request can also include information that allows the survey system 102 to format the survey to be visually consistent with other content in a webpage, or alternatively, to be visually distinct from content within the webpage.

In response to the request for a survey from the respondent client device 202, the survey system 102 determines characteristics of the content 230 (e.g., a webpage or content within the webpage) provided to the respondent client device 202 by the third-party content provider 204, as illustrated in FIG. 2B. In one or more embodiments, the survey system 102 determines characteristics of the content based on information provided in the request from the respondent client device 202. In one or more additional embodiments, the survey system 102 determines characteristics of the content by analyzing the third-party content (e.g., metadata) and/or by accessing a lookup table that indicates a topic or theme of the third-party content. The survey system 102 can also determine characteristics of other third-party content related to the accessed third-party content to determine a topic or theme of the overall website (e.g., a plurality of webpages on a website that the respondent accesses).

As further illustrated in FIG. 2B, after determining characteristics of the third-party content, the survey system 102 identifies surveys based on comparing the third-party content characteristics with characteristics of the surveys 232. Specifically, the survey system 102 accesses a survey repository that includes a plurality of surveys from a plurality of different entities to identify one or more candidate surveys to provide in response to the survey request. For example, the survey system 102 can identify candidate surveys based on tags associated with the plurality of surveys in the survey repository. To illustrate, the survey system 102 can perform a search on the survey repository to identify surveys with tags that have characteristics matching (or similar to) the determined characteristics of the content. In one more embodiments, the survey system can generate a relationship score that indicates the strength of a relationship between third-party content characteristics and characteristics of a survey.

Additionally, the survey system 102 can identify preferred third-party content providers, if any, associated with each of the surveys. For instance, the survey system 102 can identify preferred third-party content providers for a given survey from the corresponding tags, and then determine that the survey is a candidate survey even if the characteristics of the survey do not match the characteristics of the content from the third-party content provider 204. The survey system 102 may also access an administrator profile that lists one or more third-party content providers for all surveys associated with that administrator/entity.

In one or more embodiments, the survey system 102 uses a bidding system to identify candidate surveys. As mentioned, the survey system 102 can request bids from administrators for a specific website/webpage or for a specific placeholder. For instance, if the administrator previously submitted a bid for providing surveys within survey placeholders in third-party content from the third-party content provider 204, the survey system 102 can determine that surveys from the administrator are candidate surveys. The survey system 102 can also use the bidding system in conjunction with the characteristics of the surveys to identify candidate surveys. To illustrate, the survey system 102 can first determine whether the administrator submitted a bid, and then identify surveys from the administrator that match or correspond to the characteristics of the content/potential respondents.

After identifying the candidate surveys, the survey system 102 selects a survey 234 from the candidate surveys for inserting into the survey placeholder within the third-party content. In particular, the survey system 102 selects the survey based on how well the characteristics of the survey match the characteristics of the content and/or the characteristics of potential respondents. For example, the survey system 102 can score the candidate surveys based on the similarity of the characteristics of the survey and the characteristics of the content/potential respondents. To illustrate, a higher number of matching characteristics results in a higher score, while a lower number of matching characteristics results in a lower score. The survey system 102 can rank the candidate surveys using the scores, and then select the highest-ranking survey to include in the survey placeholder.

In one or more additional embodiments, the survey system 102 uses a bidding system to determine which survey to select. Specifically, the survey system 102 can use a ranking of surveys based on bids that the corresponding administrators submitted for the survey placeholder, website, and/or third-party content provider 204. For example, the survey system 102 can select a survey associated with an administrator that submitted the highest bid. If the website includes more than one placeholder, the survey system 102 can select a plurality of surveys for the survey placeholders from a single administrator based on the administrator submitting the highest bid. Alternatively, the survey system 102 can select surveys from a plurality of different administrators in order of bid ranking (e.g., the first-highest bidding administrator and the second-highest bidding administrator).

The survey system 102 can also use a combination of bids and characteristics to determine whether to select a survey. For instance, the survey system 102 can use an algorithm that considers the bids from administrators and also the similarity of the surveys to the content. To illustrate, the survey system 102 can determine a bid score for each administrator and then combine the bid score with a similarity score (i.e., based on the characteristics of the survey) to determine an overall score for the survey. Additionally, the survey system 102 can apply different weights to the bid score and the similarity score, as may serve a particular embodiment. The survey system can also select surveys based on whether a respondent has previously viewed and/or interacted with the surveys to avoid providing the same survey to a single respondent more than once.

In one or more embodiments, the survey system 102 also uses a survey provision history to determine whether to select a survey for a survey placeholder. Specifically, after the survey system 102 selects a survey for a given placeholder in content from a third-party content provider, the survey system 102 can record the selection of the survey in a survey provision history. The survey provision history can include information about the selection of the survey including, but not limited to, an identifier of the third-party content provider, an identifier of the content (e.g., webpage, placeholder), and respondent interaction statistics (e.g., how many potential respondents viewed the survey and how many respondents responded to the survey). The survey system 102 can use the information in the survey provision history to select surveys based on whether the surveys were successful (e.g., how many respondents interacted with the survey) and how often the survey was used. For instance, the survey system 102 can provide more successful surveys more frequently, or alternatively, provide surveys that are viewed less frequently.

Once the survey system 102 has selected a survey to provide within the survey placeholder of the third-party content, the survey system 102 can select question(s) from the selected survey 236 to provide to the respondent client device 202, as illustrated in FIG. 2B. To illustrate, the survey system 102 can select questions from the survey based on question identifiers that correspond to the survey identifier of the selected survey. In one or more embodiments, survey questions provided based on a survey question order defined within the survey. Thus, survey system 102 provides the survey question identified as "Question 1."

Alternatively, the survey system can conduct a survey question search within the selected survey to identify a survey question. For instance, similar to the process of associating characteristics with an electronic survey, the survey system 102 can determine and associate characteristics with individual survey questions. Accordingly, based on the search, the survey system 102 can identify a survey question within the selected survey that is most related to characteristics of the third-party content or characteristics of the respondent. As another example, the survey system can analyze received user profile information about the respondent, and if the user profile information already includes information requested in a survey question, the survey system can submit a pseudo response for that survey question, and refrain from providing that survey question in response to the request.

In addition to selecting a survey question, the survey system 102 can identify display characteristics of the survey placeholder to determine a presentation of one or more survey questions. For example, the survey system 102 can receive the survey placeholder display characteristics from information provided in the request from the respondent client device 202. For instance, based on display characteristics of the survey placeholder, the survey system 102 determines how many survey questions to provide to the respondent client device 202. In at least some embodiments, if the display characteristics indicate that the survey placeholder is large enough for displaying more than one question, the survey system 102 provides a plurality of questions to the respondent client device 202. Otherwise, the survey system 102 can provide a single question to the respondent client device 202.

The survey system 102 also formats the question(s) 238 based on the display characteristics of the survey placeholder, as shown in FIG. 2B. In particular, and based on the display characteristics, the survey system 102 can determine a display format for a specific survey question to be presented in the survey placeholder, and then format the survey question (including the available answers or response input fields) for optimal presentation according to the display characteristics of the survey placeholder. To illustrate, the survey system 102 can determine a display format for answer options corresponding to the survey question so that the survey question fits completely within the survey placeholder of the third-party content. The survey system 102 can also determine whether to display multiple questions from the survey side-by-side, sequentially, or within a scrollable frame, etc. In addition, the survey system 102 can format the questions dynamically (e.g., at the time of rendering) based on display requirements of the respondent client device 202.

As further illustrated in FIG. 2B, the survey system 102 provides the survey question(s) 240 from the selected survey to the respondent client device 202. Specifically, the survey system 102 communicates with the respondent client device 202 in response to the request for a survey and provides the selected survey question(s) with the appropriate formatting for displaying within the survey placeholder. Providing the survey question(s) to the respondent client device 202 causes the respondent client device 202 to display the survey question(s) within the survey placeholder as formatted. As such, the survey system 102 provides surveys from the administrator for displaying within the third-party content without the third-party content provider 204 communicating and/or establishing a formal relationship directly with the surveying entity.

The respondent associated with the respondent client device 202 can interact with the survey question(s) to select answers and then provide a response 242 to the survey system 102, as shown in FIG. 2C. For example, when the respondent selects an answer to a question in a survey (e.g., by interacting with the survey question within a graphical user interface), the respondent client device 202 can communicate the response to the survey system 102. The respondent client device 202 can also provide information that allows the survey system 102 to associate the response with the respondent and the question. For example, the information can include a device identifier, respondent identifier, survey identifier, question identifier, and answer identifier(s) with the response. Thus, for example, based on the various identifiers included within the response, the survey system 102 stores the response 244 and corresponding information in an analytics or results database that tracks the response statistics for the survey, as indicated in FIG. 2C.

In one or more embodiments, the survey system 102 optionally provides additional survey question(s) 246 from the selected survey for presentation in the survey placeholder within the third-party content. For example, the survey system 102 provides an additional question based on, or in response to, receiving a response to a previously provided survey question. Specifically, the survey can include more questions that the survey system 102 previously provided to the respondent client device 202. If the respondent answers a first question displayed within the survey placeholder, the respondent client device 202 can send the response to the survey system 102. The survey system 102 can then select a new question from the survey to provide within the same survey placeholder within the third-party content. The survey system 102 can also provide additional questions based on the responses from the respondent client device 202, such that the survey system 102 can dynamically customize the administration of the survey to different respondents based on the responses from each respondent.

Additionally, the survey system 102 can report survey results 248 to the administrator client device 200. For example, the survey system 102 can access the analytics/results database that stores and maintains the results (e.g., a combination of various responses from various respondents) for a survey associated with the administrator. The survey results can indicate the performance of the surveys associated with the administrator including, but not limited to, the number of impressions, the number of interactions, the number of responses, the number of times requested, the number of unique respondents, respondent demographics, information about the third-party content providers, answers selected, and other similar information.

Although FIGS. 2B-2C illustrate that the survey system 102 administers a survey within a survey placeholder of third-party content, the survey system 102 can allow a respondent to respond to the survey from a website associated with the survey system 102. Specifically, the survey system 102 can provide, within the survey placeholder, a link to the website associated with the survey system 102 that redirects the respondent to a landing page where the survey system 102 administers the full survey. In particular, the survey system 102 can provide a link for display within the survey placeholder, where the link points to a specific survey that relates to the third-party content and/or respondent. Accordingly, the survey system 102 can allow administrators to provide targeted surveys to a wide audience that include respondents that have no previous relationship with the surveying entity.

Figure 3A:
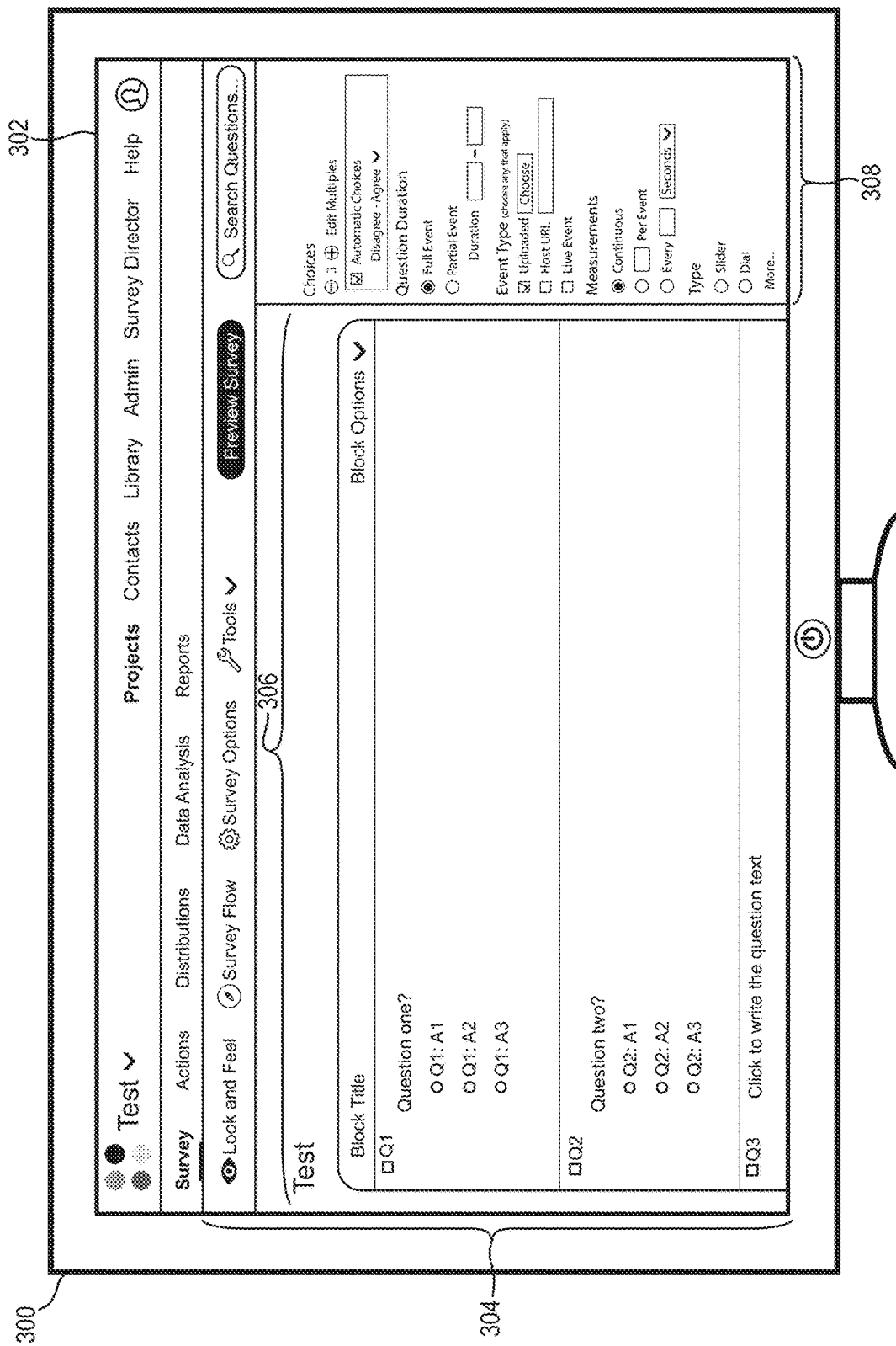
Figure 3B:
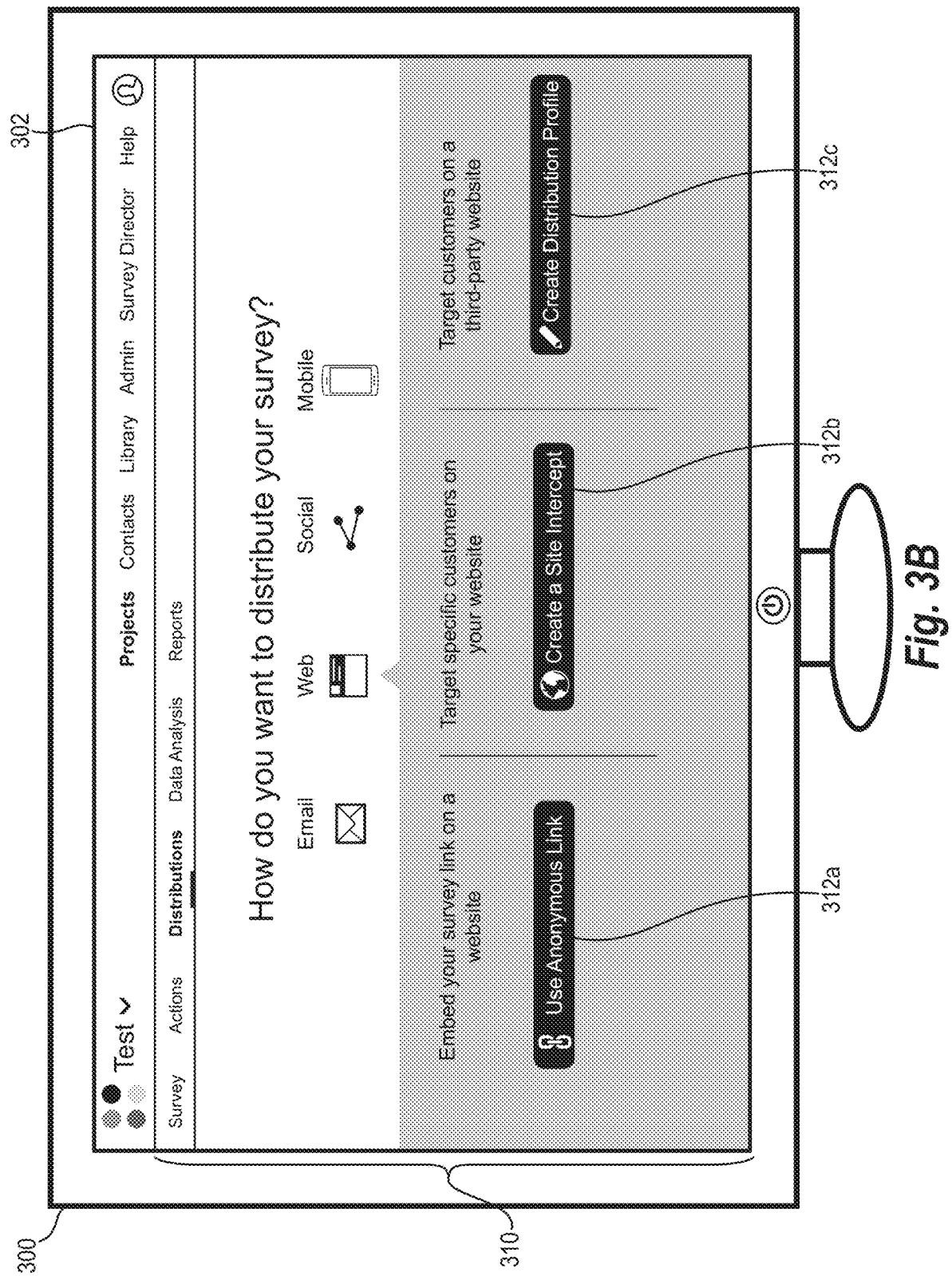
Figure 3C:
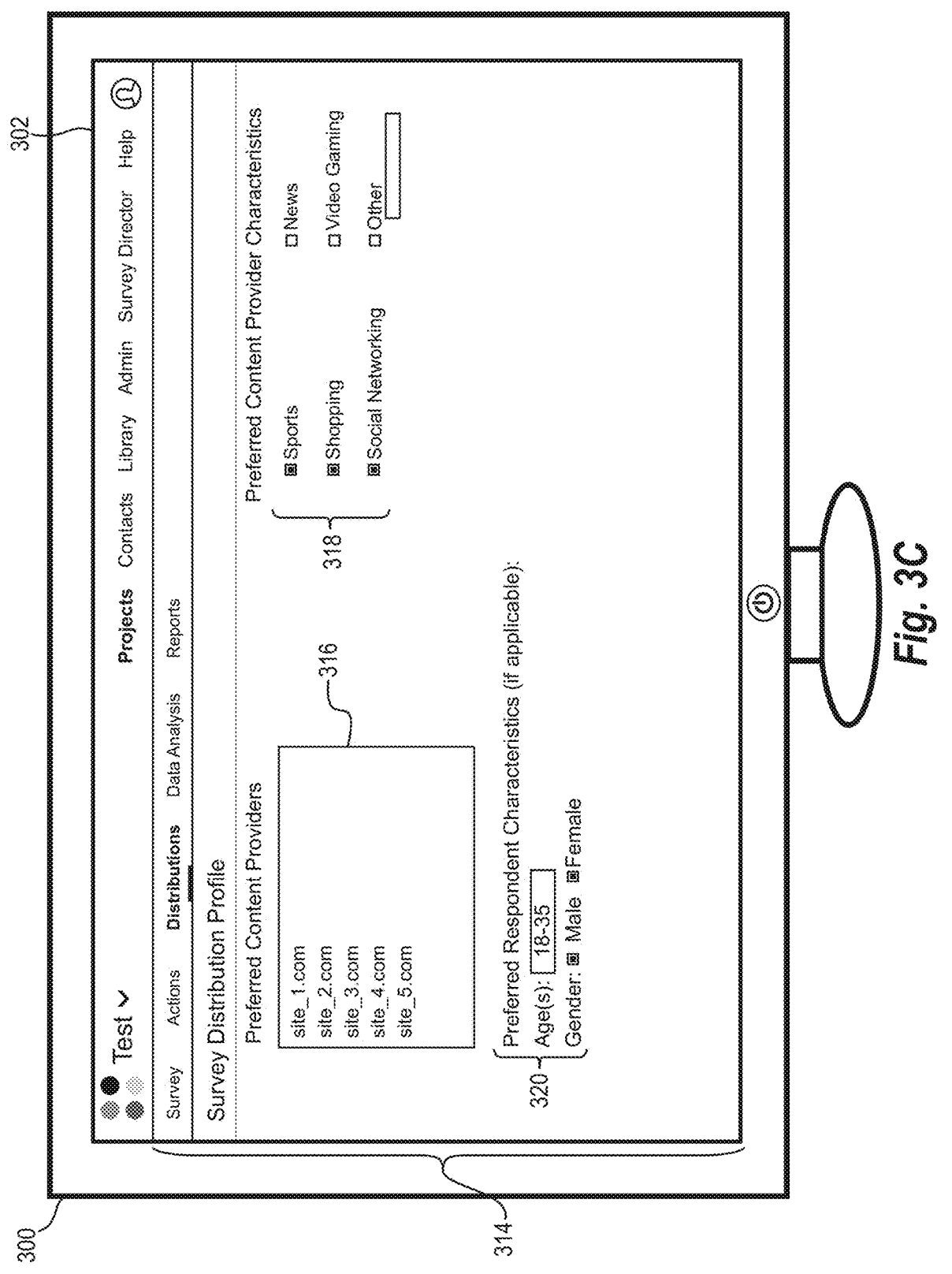

FIGS. 3A-3C illustrate example graphical user interfaces ("GUIs") on an administrator client device 300. The GUIs provide various views of an administrator application for creating and setting up distribution of a survey. In particular, the administrator application of FIGS. 3A-3C can include an application that allows a user (e.g., an administrator) to create a survey using the survey system, as described previously. In one or more embodiments, the administrator application is a web browser that accesses a web application of the survey system, where the administrator can log into an administrator account of the survey system to create new surveys and view/edit previously created surveys.

With reference to FIG. 3A, the administrator client device 300 includes an administrator application 302 that allows an administrator to create a survey, including one or more survey questions. Specifically, the administrator application 302 includes a creation interface 304 that displays survey questions and options associated with the survey questions. The creation interface 304 allows an administrator creating a survey to create and modify one or more survey questions in a survey. For example, the creation interface 304 can include a question section 306 that displays the survey questions in a survey. The question section 306 allows the administrator to create questions, edit questions, and delete questions in a survey.

In one or more embodiments, the creation interface 304 allows an administrator to create a new question by selecting an option to create a new question. In one or more embodiments, if the survey does not already include a question, the creation interface 304 provides a default question with default content. For example, the default content can include brief instructions on how to replace the default content with text for the survey question. The administrator can interact with the default content to replace the default content with question text in a question field and answers for the question in one or more answer fields, depending on the question and question type.

Additionally, the creation interface 304 allows an administrator to edit an existing question in the question section 306. For instance, the creation interface 304 can allow the administrator to edit the text in either the question field or the answer field(s) to modify the content of the survey question. To illustrate, the administrator may modify the question field and/or the answer field(s) to reduce ambiguity in the question or answer(s) and to improve the understandability of the question. Alternatively, the administrator can delete a question from the survey by interacting with a deletion element for the question in the creation interface 304. The creation interface 304 also allows the administrator to change the order of the questions within the question section 306.

In one or more embodiments, the creation interface 304 allows the administrator to set a plurality of options associated with a survey question. For example, the creation interface 304 allows the administrator to set a question type for each survey question including, but not limited to, perception, multiple choice questions, open ended text entry, sliders, rank orders, heat maps, or other question types that allow respondents to provide responses to a survey question. The creation interface 304 can also allow the administrator to set one or more preferences for each survey question. In particular, the creation interface 304 includes an option section 308 that includes a plurality of options that are specific to the selected question. For example, each question type has a predetermined set of options that the administrator may set/change for each question of that question type.

After creating a survey, the administrator can setup distribution for the survey via a variety of distribution methods. Specifically, as illustrated in FIG. 3B, the administrator application 302 includes a distribution interface 310 that provides a plurality of distribution options to the administrator. Each distribution option corresponds to a method of distributing the survey, including a specific medium for distributing the survey. For instance, the distribution options can include a link option 312a, an administrator site option 312b, and a third-party site option 312c. The link option 312a allows the administrator to create a link for sending to respondents to allow the respondents to access the survey at a location (e.g., webpage) hosted by the survey system 102. The administrator site option 312b allows the administrator to embed and administer the survey within a webpage of the entity with which the administrator is associated (e.g., a brand webpage). As described in more detail below, the third-party site option 312c allows the administrator to distribute and administer the survey to a plurality of respondents via third-party content (e.g., third-party webpages).

In one or more embodiments, selecting the third-party site option 312c causes the administrator application 302 to display a profile interface 314, as illustrated in FIG. 3C. In particular, to distribute the survey via third-party content, the survey system can allow the administrator to set up a survey distribution profile that establishes one or more characteristics of the survey. Because the survey distribution profile defines characteristics of the survey, the survey distribution profile is specific to the survey. As previously mentioned, an entity can also set up an entity profile that allows the entity to establish general characteristics that apply to all surveys associated with the entity.

As illustrated, the survey distribution profile includes various types of characteristics that the administrator can associate with the survey. For instance, the survey distribution profile can include a provider input field 316, a provider characteristic list 318, and potential respondent characteristics 320. The provider input field 316 allows the administrator to input one or more preferred third-party content providers to associate with the survey. Designating one or more preferred third-party content providers in the provider input field 316 indicates to the survey system that the administrator desires to distribute the survey to the indicated providers. Additionally, the administrator can modify the list of preferred third-party content providers at any time after creating the survey to modify the distribution of the survey.

The administrator can also select one or more preferred content provider characteristics for the survey distribution profile. For instance, the provider characteristic list 318 can include a plurality of selectable items that correspond to general topics or themes of third-party content to associate with the survey. To illustrate, the provider characteristic list 318 can include checkboxes for topics such as sports, shopping, social networking, news, video gaming, and others. The provider characteristic list 318 can also include an option to add additional topics that are not explicitly listed in the provider characteristic list 318. The administrator can thus select as many of the topics that the administrator desires to associate with the survey.

Furthermore, the survey distribution profile can include potential respondent characteristics 320 that the administrator can select to associate with the survey. Specifically, the administrator can target the survey for a particular pool of potential respondents by inputting one or more preferred respondent characteristics 320 of the potential respondents. For example, the administrator can input one or more age ranges of potential respondents. Additionally, the administrator can select one or more genders to target with the survey. The preferred respondent characteristics 320 can also include additional characteristics that describe demographics of potential respondents, including, but not limited to, geographic location, nationality, race, and income level, occupation, etc.

According to one or more embodiments, the survey system uses information from the survey distribution profile to determine distribution of the survey. Specifically, the survey system can analyze the survey distribution profile to identify preferred characteristics of third-party content providers and the corresponding content and/or preferred characteristics of potential respondents. As described in more detail below with respect to FIGS. 4A-6C, the survey system can provide a survey to a respondent client device in connection with third-party content by matching the characteristics of the respondent and/or the third-party content to the information in the survey distribution profile. To illustrate, in response to a request to provide a survey, the survey system can access the information from the survey distribution profile in metadata tags or in a separate file including the information.

FIGS. 4A-4D illustrate a respondent client device 400 that runs a client application 402 for accessing content from a third-party content provider. In particular, the content from the third-party content provider can include a website with one or more webpages associated with the third-party content provider. The client application 402 can include a web browser or other application that allows a user (e.g., "respondent") to view and interact with the third-party content. Additionally, the respondent can use the client application 402 to access content from any third-party content provider.

Figure 4A:
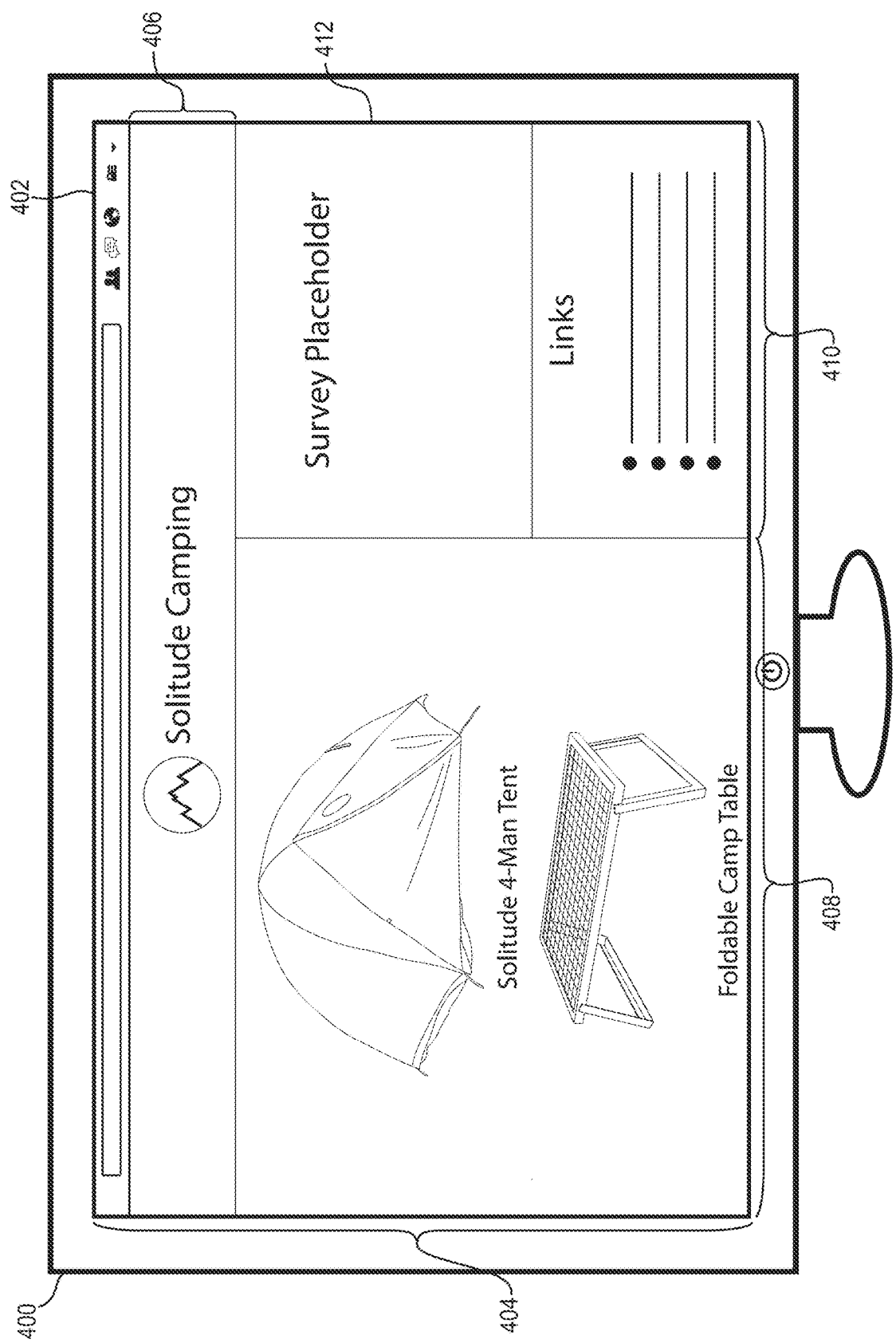
FIGS. 4A-4D illustrate example graphical user interfaces for administrating an electronic survey in accordance with one or more embodiments.

As illustrated, FIG. 4A includes a browser interface 404 that includes the third-party content (e.g., a webpage) as provided by the third-party content provider. The third-party content can include any type of content including text, images, video, audio, or other media content within the browser interface. Furthermore, the third-party content provider can format the content according to any display layout based on design preferences of the third-party content provider and the specific content (e.g., content type, amount of content). To illustrate, webpages typically include a page header 406, a primary content section 408, and one or more secondary content sections 410.

According to one or more embodiments, the browser interface 404 displays a page header 406 (e.g., title or name of the content in the primary content section) of the webpage. Additionally, the browser interface 404 displays the primary content of the webpage within the primary content section. The primary content section 408 can include an article, images, video, or other content that the third-party content provider created or otherwise inserted into the webpage. The secondary content sections 410 can include surveys, advertisements, links, and other content that is not the primary focus of the webpage. FIG. 4A is only an example, and various types of content can be presented in almost any location within a webpage, for example, a survey placeholder can have a location within the primary content section 408.

When the respondent client device 400 accesses, and subsequently renders the webpage (e.g., by requesting the content from a server hosted by, or otherwise associated with, the third-party content provider), the respondent client device 400 requests a survey for display within a survey placeholder 412. In particular, the survey placeholder 412 includes code that causes the respondent client device 400 to request an available survey from a survey repository of the survey system. To illustrate, the code can include an API call to the survey system with information that allows the survey system to select a survey that corresponds to characteristics of the third-party content and/or characteristics of the respondent.

After the survey system selects a survey for the survey placeholder, the survey system can determine the display characteristics of the survey placeholder 412. For instance, the survey system can determine that the survey placeholder 412 has specific display dimensions. Based on the display dimensions of the survey placeholder 412, the survey system can select one or more survey questions from the survey to provide to the respondent client device 400 for presentation within the survey placeholder 412. Additionally, the survey system can select a format for survey questions provided to the respondent client device 400.

Figure 4B:
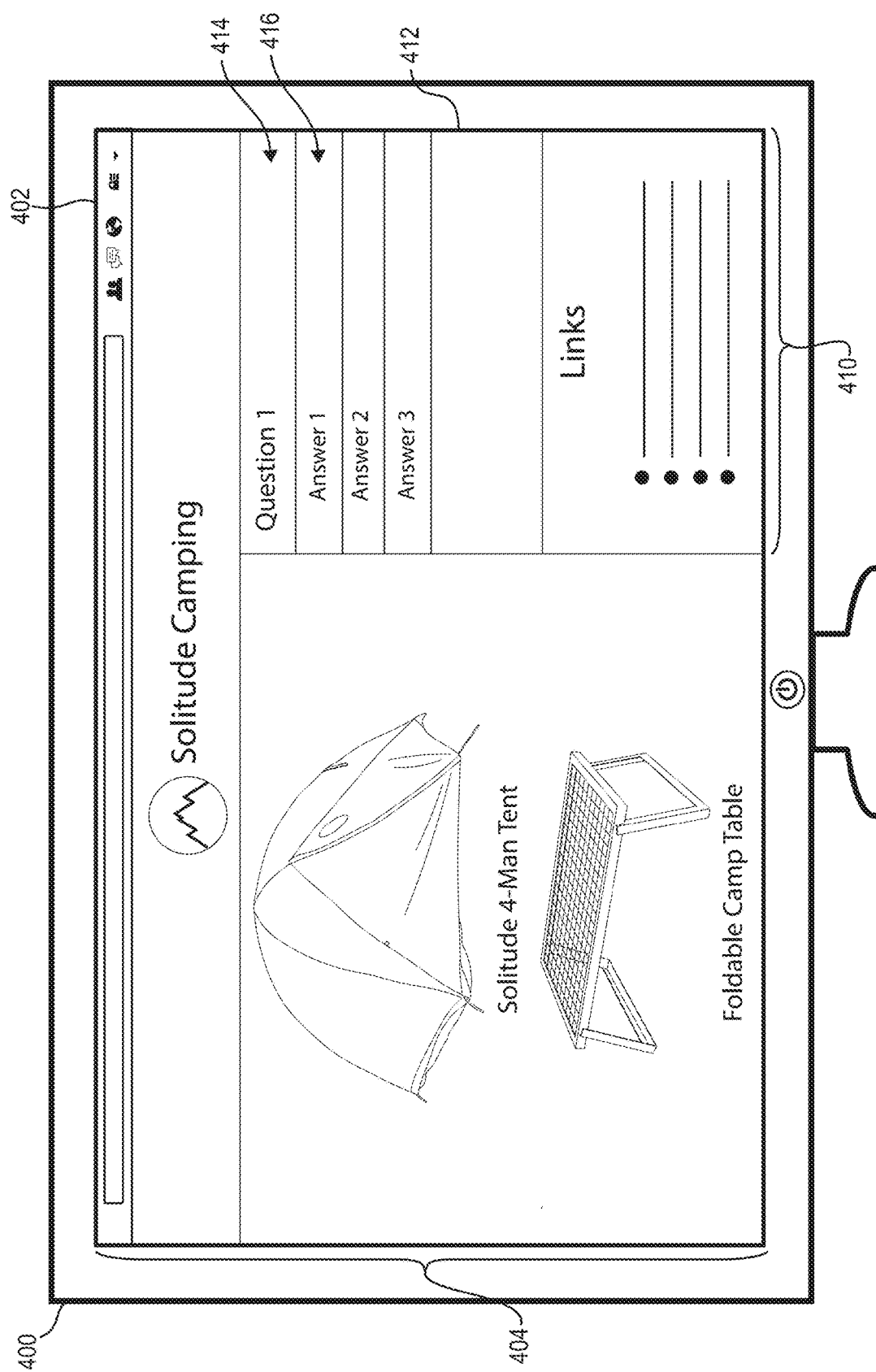

FIG. 4B illustrates a survey question from the selected survey within the survey placeholder 412. As shown, the survey system causes the client device to display a first question 414 within the survey placeholder in accordance with the display dimensions of the survey placeholder 412. Additionally, the formatting of the first question 414 includes text of the first question and a plurality of selectable answer options corresponding to the first question 414. For instance, the survey system can provide the first question 414 with specific dimensions based on the dimensions of the survey placeholder 412. Alternatively, the survey system can provide the first question 414 with dynamic dimensions to automatically fit within the survey placeholder even if the dimensions of the survey placeholder 412 change while the respondent is viewing the first question 414.

The survey system also formats the answer options corresponding to the first question 414 to fit within the display dimensions of the survey placeholder 412. The survey system can format the answers using one of a plurality of display formats such as a checkbox, selectable element including the answer (e.g., rectangular element 416 with the answer as text within the rectangular element, as in FIG. 4B). For instance, the survey system can format the first question 414 to display all of the available answers for the question underneath the question prompt. The format of the answers can also depend on the question type, such that the format of answers to a multiple-choice question can be different than the format of responses to a rating question in which a respondent provides a rating for a given prompt.

After the respondent client device 400 renders a question (e.g., the first question 414) within the browser interface 404, one or more embodiments allow the respondent to interact with the question. Specifically, the survey system can administer the survey within the webpage of the third-party content so that the respondent can view and respond to one or more questions of the survey without leaving the webpage. In one or more embodiments, the respondent uses an input device such as a mouse or a touchscreen to select an answer for the question displayed. When the respondent selects an answer, the client application 402 can update an appearance of the question and/or the answer to indicate that the respondent has selected an answer. In at least some implementations, the client application 402 requests that the respondent confirm the selected answer prior to communicating the selected answer to the survey system.

After the user selects an answer and the respondent client device 400 sends the response to the survey system, the survey system determines whether the survey includes any additional questions. If the survey system determines that the survey includes additional questions, the survey system can select a second question 418, illustrated in FIG. 4C, from the survey to provide to the respondent client device 400. For example, the survey system can select the second question 418 from a sequential list of questions in the survey. Alternatively, the survey system can use the response data to determine which question to provide to the respondent client device 400. To illustrate, the survey system can include a branching set of questions in the survey that selects a question flow based on the responses of the respondent.

Figure 4C:
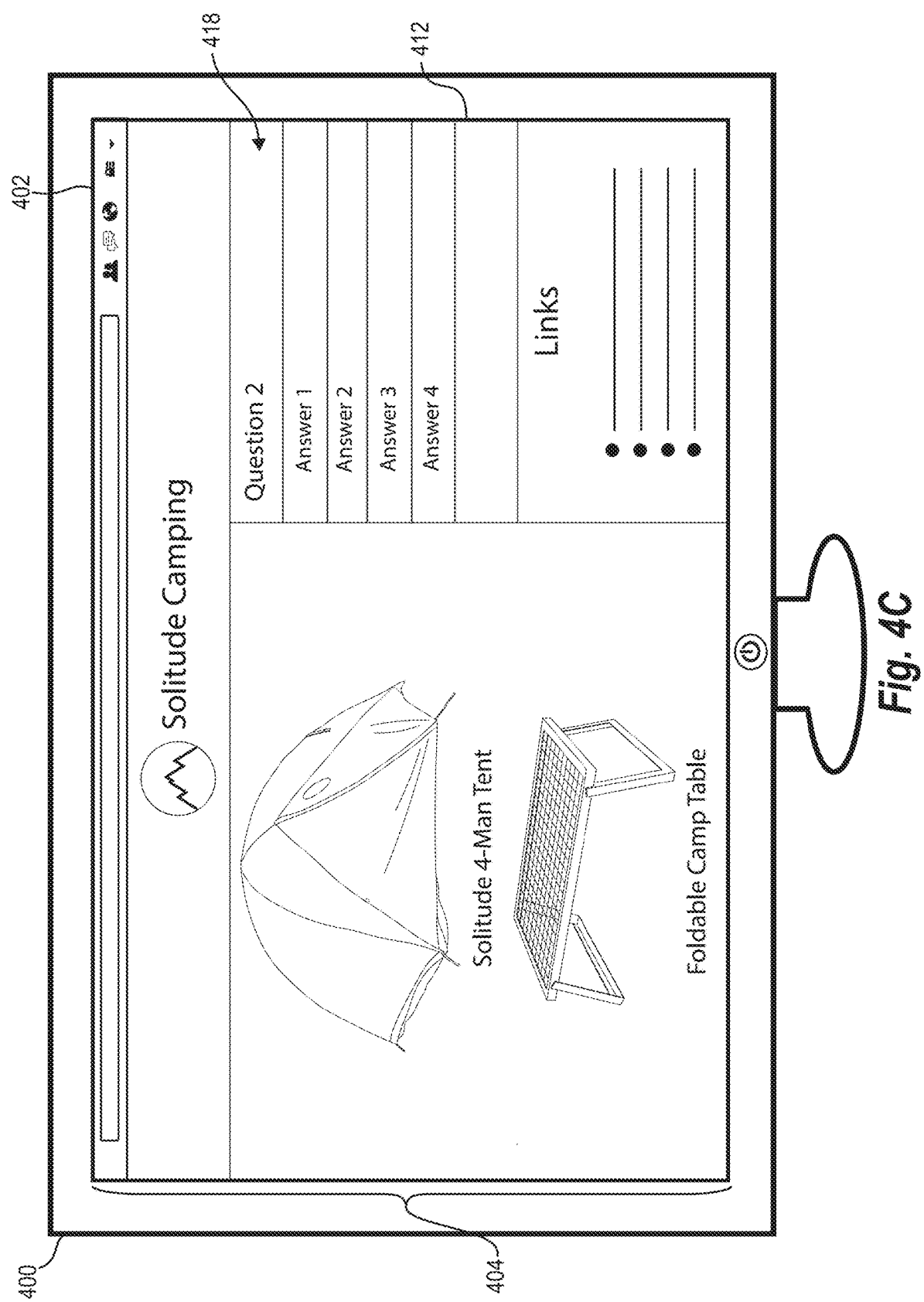

The survey system also formats the second question according to the display characteristics of the survey placeholder 412 in the webpage. Specifically, the survey system uses the survey placeholder display characteristics previously received from the respondent client device 400 to determine how to format the second question 418. As illustrated in FIG. 4C, the second question 418 includes a different number of answers than the first question 414. Because the second question 418 includes a different number of answers than the first question 414, the survey system can format the second question 418 and the corresponding answers accordingly. To illustrate, the survey system can reduce a display size of the answers (i.e., the selectable elements) so that the question and all of the answers fit within the survey placeholder 412 in the webpage.

Figure 4D:
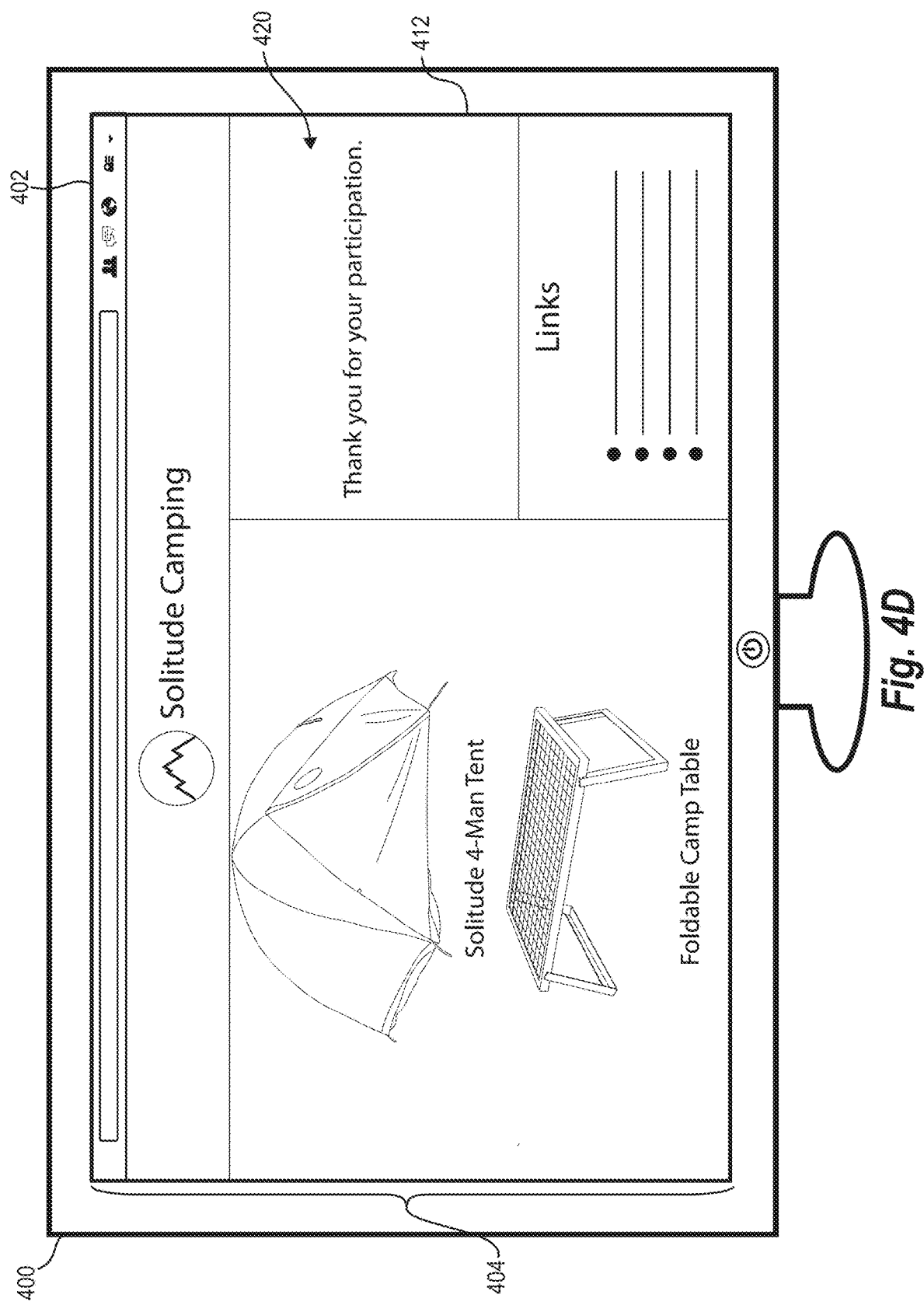

In one or more embodiments, the survey system administers the survey by providing any additional questions until the respondent reaches the end of the survey (e.g., until the survey has not more additional questions). In particular, the survey system updates the information displayed to the respondent within the survey placeholder 412 while the respondent interacts with the survey. Thus, the survey system can administer the survey and continuously update the information within the survey placeholder 412 based on the questions in the survey and the responses from the respondent. When the respondent completes the survey, the survey system can send a survey completion message 420 to display within the survey placeholder 412, as illustrated in FIG. 4D.

In one or more embodiments, the survey system collects response information from the respondent client device 400 as the respondent responds to each question of the survey. This allows the survey system to dynamically adapt the survey to the responses from the respondent. Alternatively, the survey system can collect response information from the respondent client device 400 after the respondent has completed the survey. In such case, the survey system can provide a plurality of questions to the respondent client device 400 in response to the request for a survey. The respondent client device 400 can then display each of the questions provided to the respondent client device 400 in an order designated by the survey system.

Figure 5A:
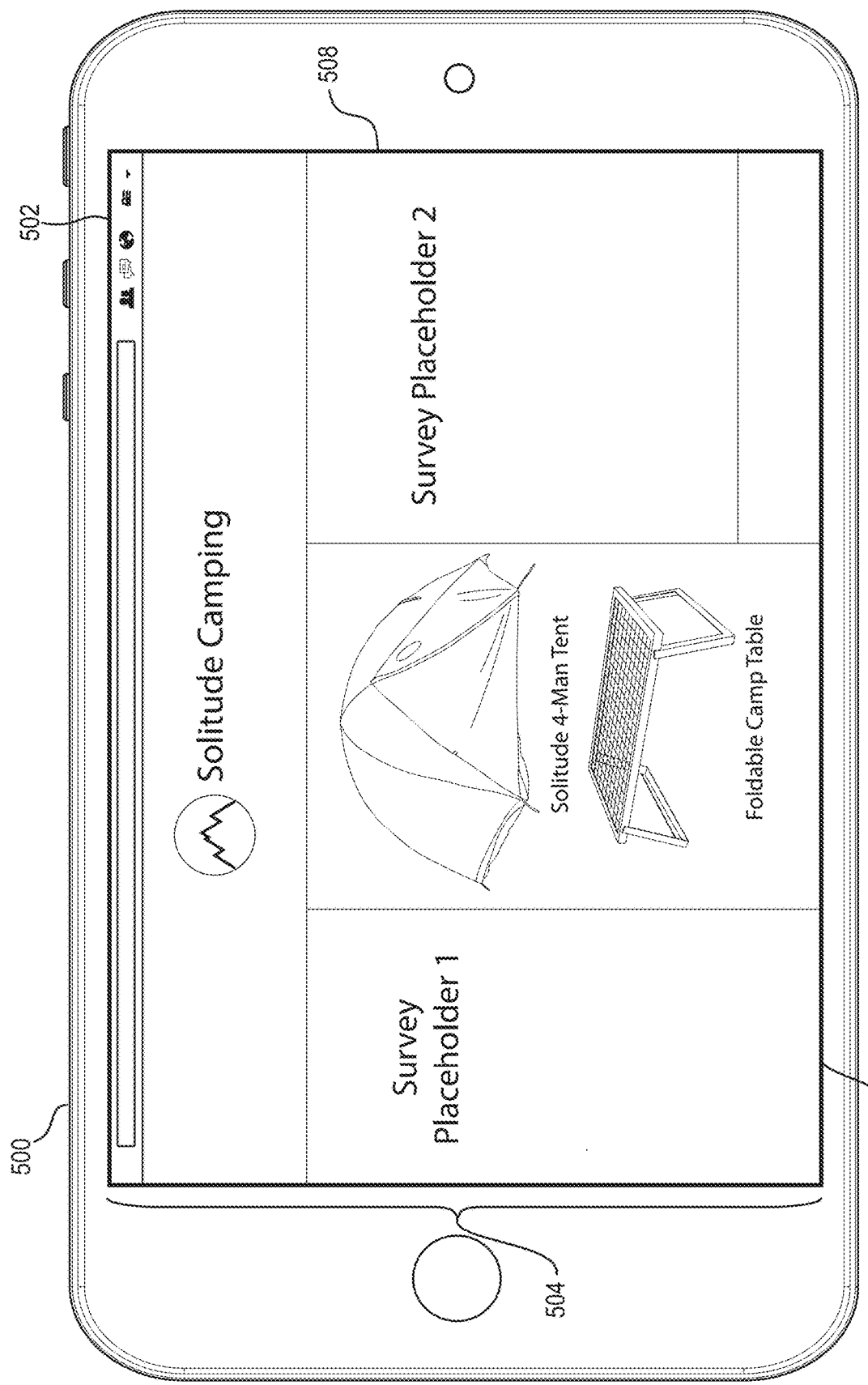
FIGS. 5A-5B illustrate example graphical user interfaces for administering a plurality of electronic surveys in accordance with one or more embodiments.
Figure 5B:
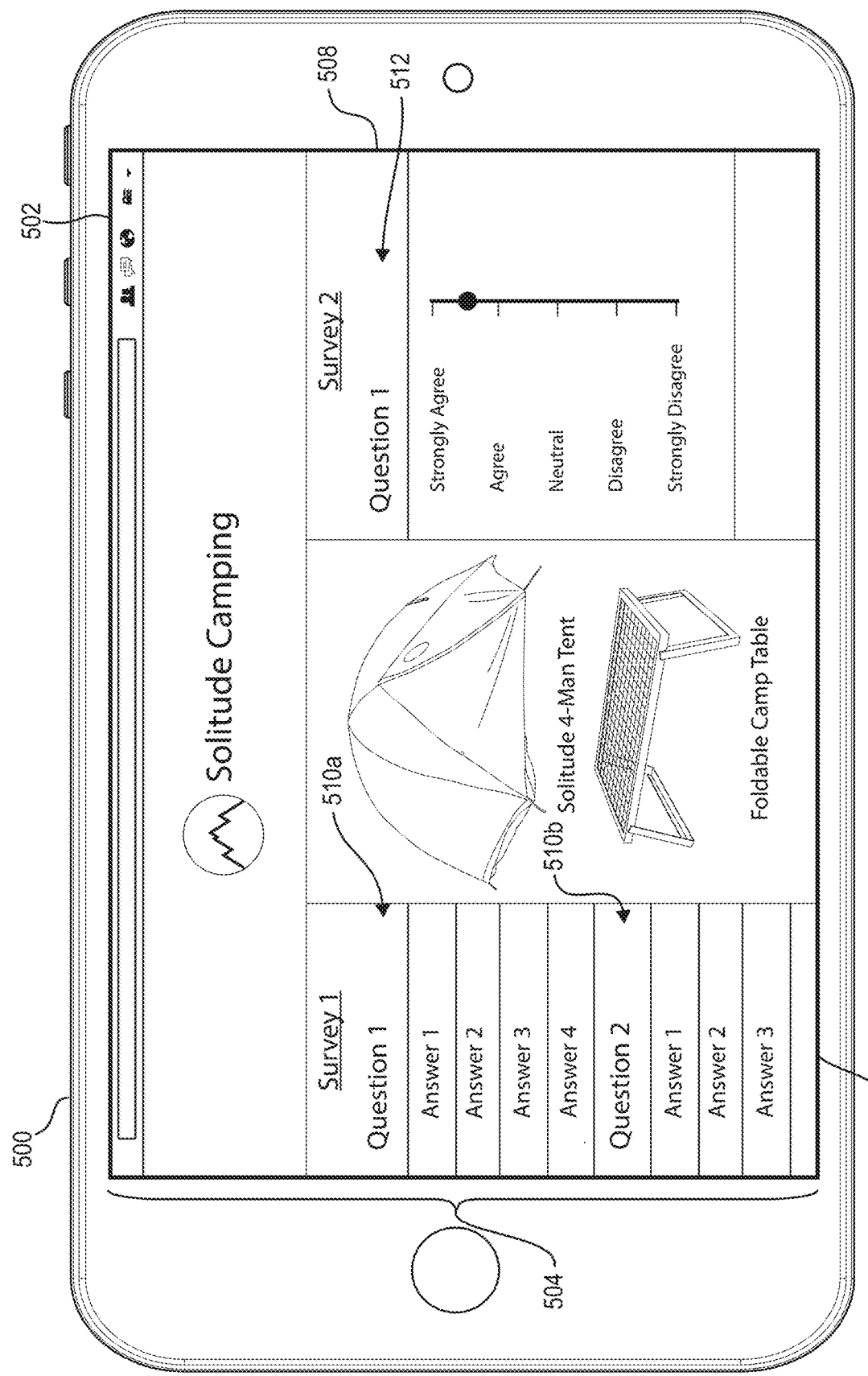

While FIGS. 4A-4D illustrate the distribution and administration of a single survey for a survey placeholder of a webpage, the survey system can provide more than one survey for display in a single webpage. FIGS. 5A-5B illustrate embodiments of a user interface for administering a plurality of surveys in a plurality of placeholders. In particular, a respondent client device 500 includes a client application 502 that provides a browser interface 504 for a respondent to view a webpage associated with a third-party content provider. FIG. 5A illustrates that the webpage can include a first placeholder 506 and a second placeholder 508 at different locations within the webpage.

For each placeholder in the webpage, the client application 502 can execute the code for the webpage to render a plurality of sections associated with requesting surveys from the survey system. To illustrate, the client application 502 executes code to render the first placeholder 506 to request a first survey from the survey system. The client application 502 can also execute code to render the second placeholder 508 to request a second survey from the survey system. After identifying code for the first placeholder 506 and the second placeholder 508, the client application 502 can cause the respondent client device 500 to request a first survey for the first placeholder 506 and a second survey for the second placeholder 508.

Based on the requests, the survey system selects the first survey and the second survey based on the characteristics of the webpage and/or the respondent compared to the characteristics of the available surveys. Because the respondent client device 500 requests more than one survey for a single webpage, the survey system can select two different surveys to display within the first placeholder 506 and the second placeholder 508, as illustrated in FIG. 5B. Additionally, each of the selected surveys can include similar characteristics based on the survey system matching the surveys to the webpage and/or respondent.

When providing the first survey and the second survey to the respondent client device 500, the survey system responds to each request separately. Specifically, the survey system identifies the display characteristics of the first placeholder 506 for the first survey to determine how many questions to provide for the first survey in the first placeholder 506. Additionally, the survey system uses the display characteristics of the first placeholder 506 to determine how to format the question(s) from the first survey. The first placeholder in FIG. 5B includes two multiple choice questions 510a, 510b from the first survey. Accordingly, the survey system can format the multiple-choice questions based on the amount of space available in the first placeholder 506. Alternatively, the survey placeholder can present a text box for a respondent to input text within the survey placeholder as a response to a survey question.

Similarly, the survey system identifies the display characteristics of the second placeholder 508 for the second survey to determine how many questions to provide for the second survey in the second placeholder 508. The survey system also uses the display characteristics of the second placeholder 508 to format the question(s) from the second survey. As illustrated, the second placeholder 508 includes one slider question 512 from the second survey. The survey system can format the slider question 512 from the second survey to fit within the second placeholder 508 by setting an orientation, length, and response spacing associated with the slider question 512.

In one or more alternative embodiments, the survey system selects a single survey to provide in the first placeholder 506 and the second placeholder 508. For instance, the survey system can select a survey to provide to the respondent client device 500 and then select a plurality of questions from the selected survey for displaying within the first placeholder 506 and the second placeholder 508. As a result, the respondent can view a plurality of questions from the same survey within different placeholders of the webpage. The survey system can allow the respondent to respond to the questions in a particular sequence or according to any order the respondent desires. Furthermore, the survey system can update each question from the survey individually by replacing each question as the respondent answers the question (e.g., by replacing the question from either placeholder with an additional question).

Figure 6A:
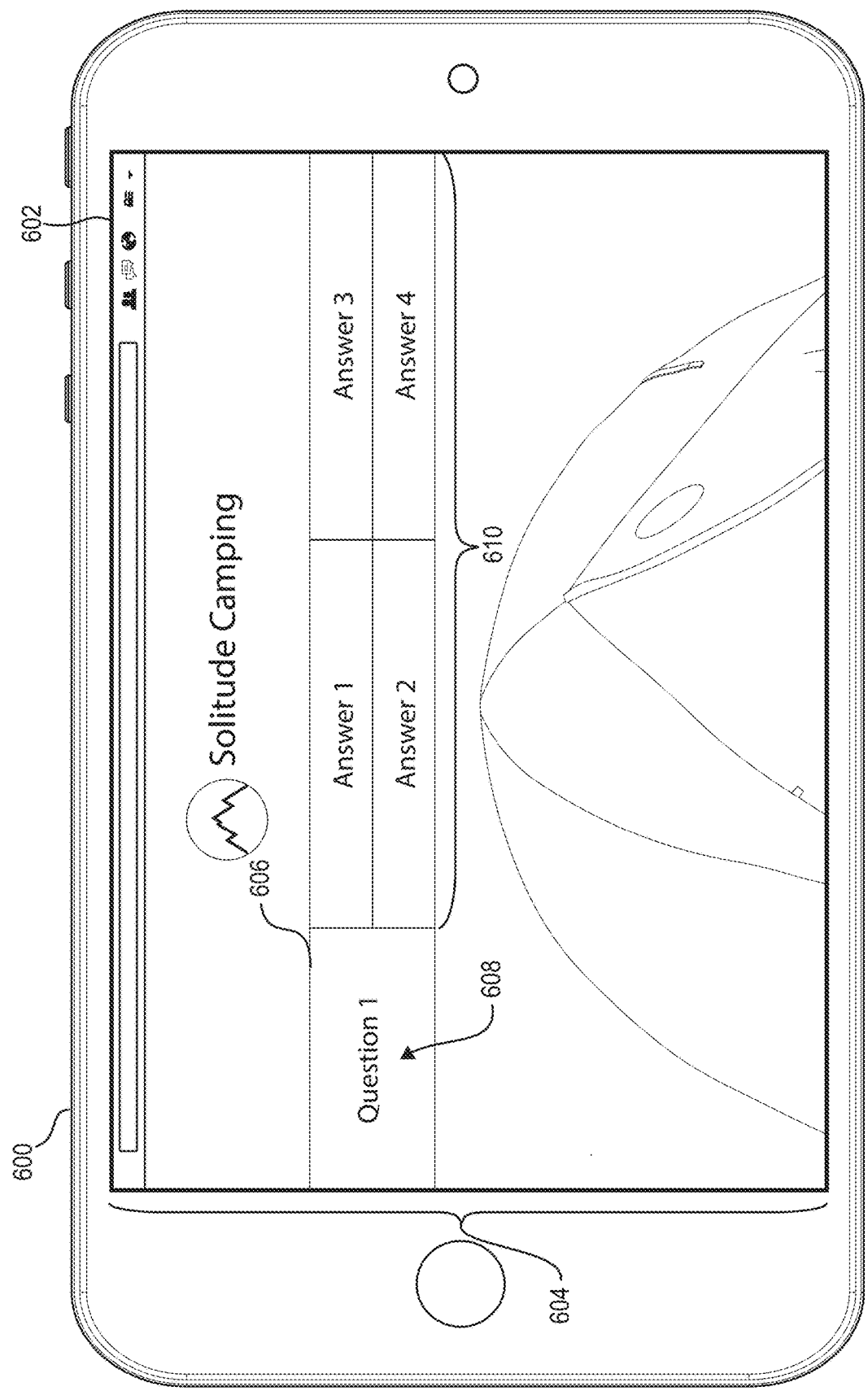
FIGS. 6A-6C illustrate example graphical user interfaces for customizing an electronic survey in accordance with one or more embodiments.
Figure 6B:
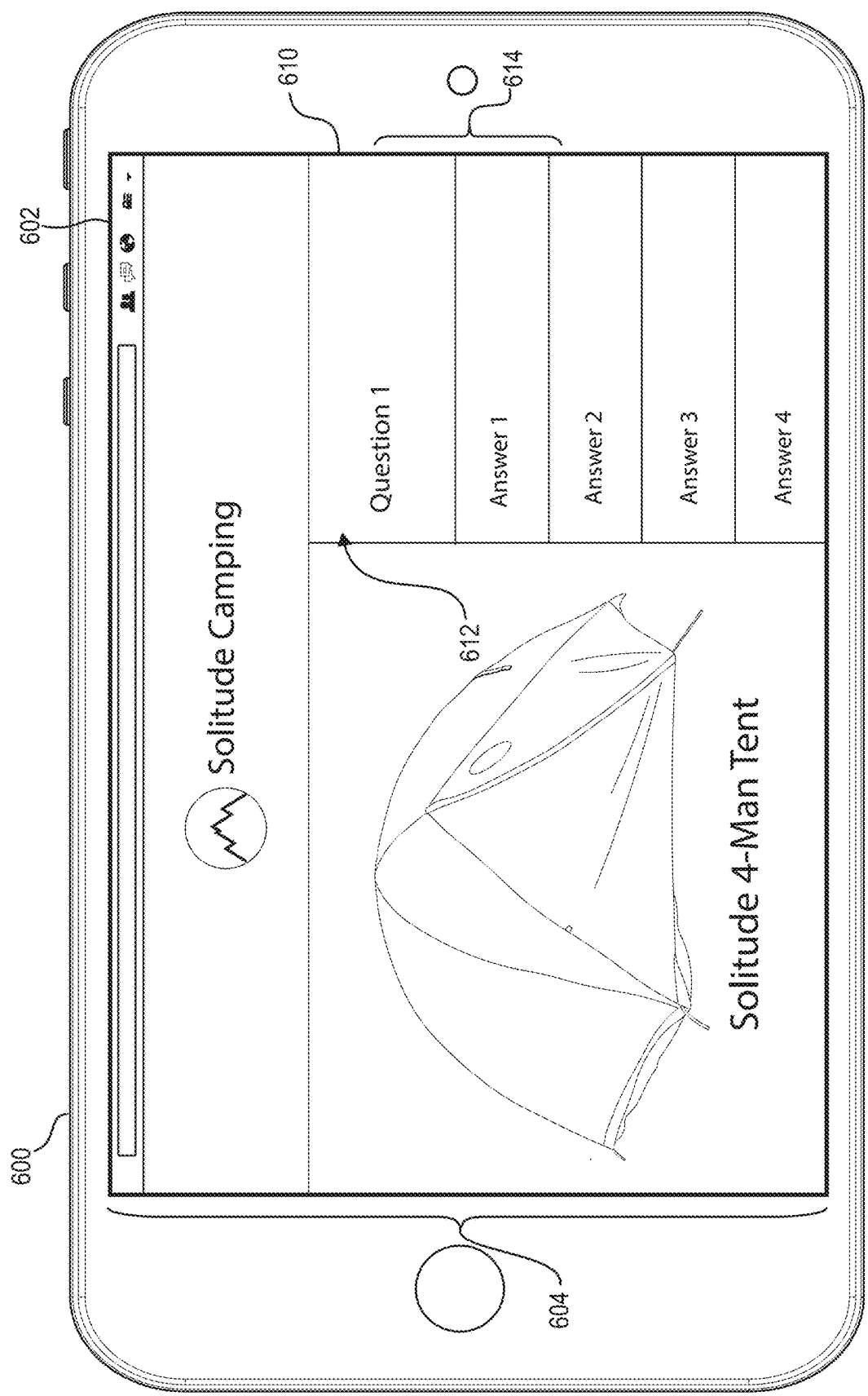
Figure 6C:
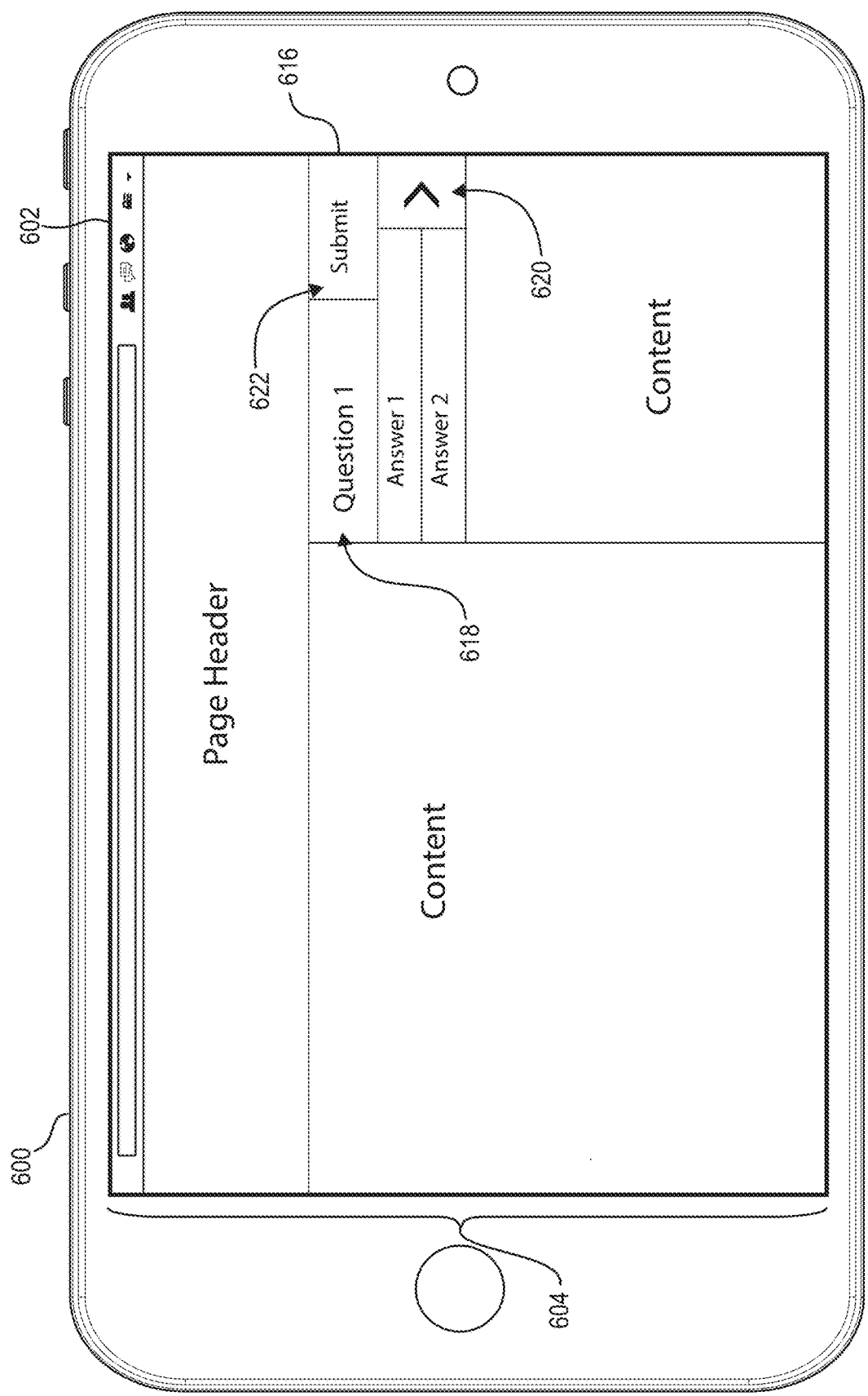

As previously mentioned, the survey system can format questions based on the size, shape, or other display characteristics of a survey placeholder. FIGS. 6A-6C illustrate a plurality of user interfaces that include survey questions within placeholders of different sizes and shapes. Specifically, the survey system can customize surveys (e.g., survey questions) in a variety of ways to fit within the corresponding placeholders. For instance, the survey system can format an appearance or layout of a survey question and answers according to the corresponding placeholder.

FIG. 6A illustrates a user interface with a first formatting for a question in a survey. In particular, a respondent client device 600 includes a client application 602 with a browser interface 604 displaying a webpage associated with a third-party content provider. According to the embodiment of FIG. 6A, the webpage includes a survey placeholder 606 that stretches across a width of the webpage. For instance, the third-party content provider can insert the survey placeholder 606 as a banner that stretches across the webpage between the page header and the content by inserting a div (or other) element at the specified location. Additionally, the div element can include code that causes the client application 602 to request a survey for display in the survey placeholder 606.

Because the survey placeholder 606 stretches across the webpage, the survey system can use the wide dimensions of the survey placeholder 606 to stretch one or more questions from the selected survey across the width of the page. To illustrate, the survey system can select a question 608 to display within the survey placeholder and then set a layout of the question 608 to fit to the dimensions of the survey placeholder. For example, the survey system can determine a width and a height of the survey placeholder 606 and set a width and height of the question 608 to match (or fit within) the width and height of the survey placeholder 606. By placing the answers 614 to the question in a certain way (e.g., placing the answers 614 in a plurality of columns side-by-side), the survey system can make use of the available space in the survey placeholder 606. Additionally, the survey system can format the answers 614 by elongating the corresponding selectable elements to fit the dimensions of the survey placeholder 606.

FIG. 6B illustrates the browser interface 604 including a webpage with a second formatting for a question in a survey. Specifically, the client application 602 of the respondent client device 600 can provide the browser interface 604 displaying a different webpage associated with a third-party content provider (e.g., the same provider as in FIG. 6A or a different provider). According to the embodiment of FIG. 6B, the webpage includes a survey placeholder 610 on a sidebar of the webpage. To illustrate, the third-party content provider can insert the survey placeholder 610 as a sidebar to the side of a primary content section of the webpage by inserting a div element at the specified location.

When the respondent client device requests a survey for the survey placeholder 610, the survey system determines a width and a height of the survey placeholder 610 and sets the width and height of a corresponding question 612 to fit within the dimensions of the survey placeholder 610. The survey system can maximize the usage of the space within the survey placeholder 610 by adjusting the width, height, and positioning of each of the selectable elements corresponding to the answers of the survey. Accordingly, FIG. 6B illustrates answers 614 ordered vertically in a single column within the survey placeholder 610.

Along similar lines, the survey system can format a question from a survey to fit within a survey placeholder that is not large enough to fit the question prompt and all of the answers at the same time. FIG. 6C illustrates an embodiment of the browser interface 604 in which the client application 602 of the respondent client device 600 presents a webpage of a third-party content provider including a survey placeholder 616 with a smaller display size than the display size of a survey question. As illustrated, the survey placeholder 616 can have a height and/or a width that is smaller than a total height and/or width of a survey question 618 from a selected survey. Thus, the browser interface 604 cannot display the entirety of the question (and corresponding answer options) simultaneously.

In one or more embodiments, to format the question 618 to fit within the survey placeholder 616, the survey system can divide the answer options into separate, navigable sections. Specifically, if all of the answer options to the survey question 618 are not able to fit within the survey placeholder 616 at one time, the survey system can split the answers into two or more groups and then include a navigation element 620 in the survey placeholder 616. The respondent can select the navigation element 620 to switch between a first group of answers and a second group of answers. Additionally, the survey placeholder can include a submit element 622 that allows the user to select an answer (e.g., by selecting a radio button corresponding to the answer), and submit the selected answer to the survey system by selecting the submit element.

Figure 7:
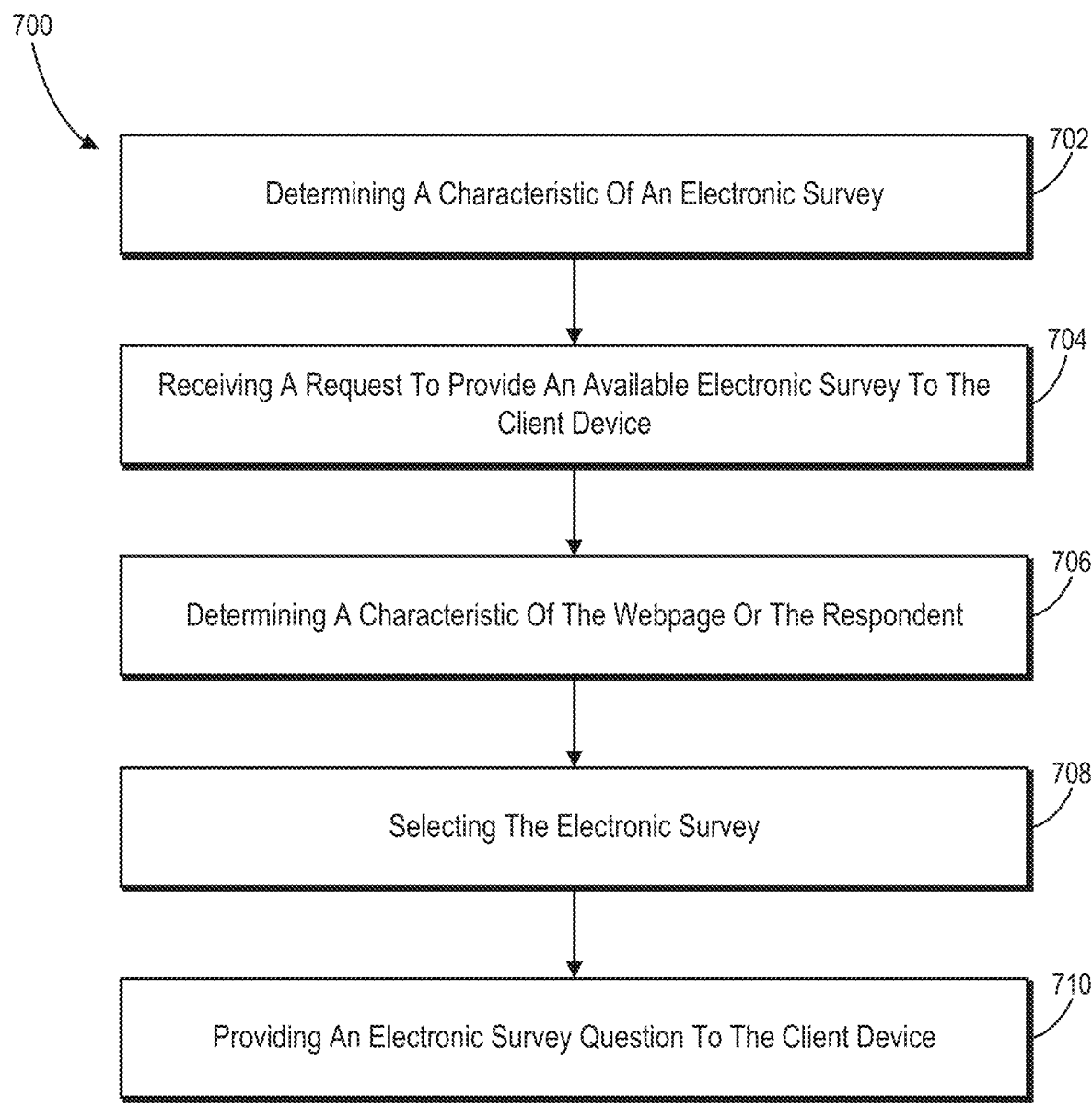
FIG. 7 illustrates a flowchart of a series of acts in a method for distributing an electronic survey via third-party content in accordance with one or more embodiments.
Figure 8:
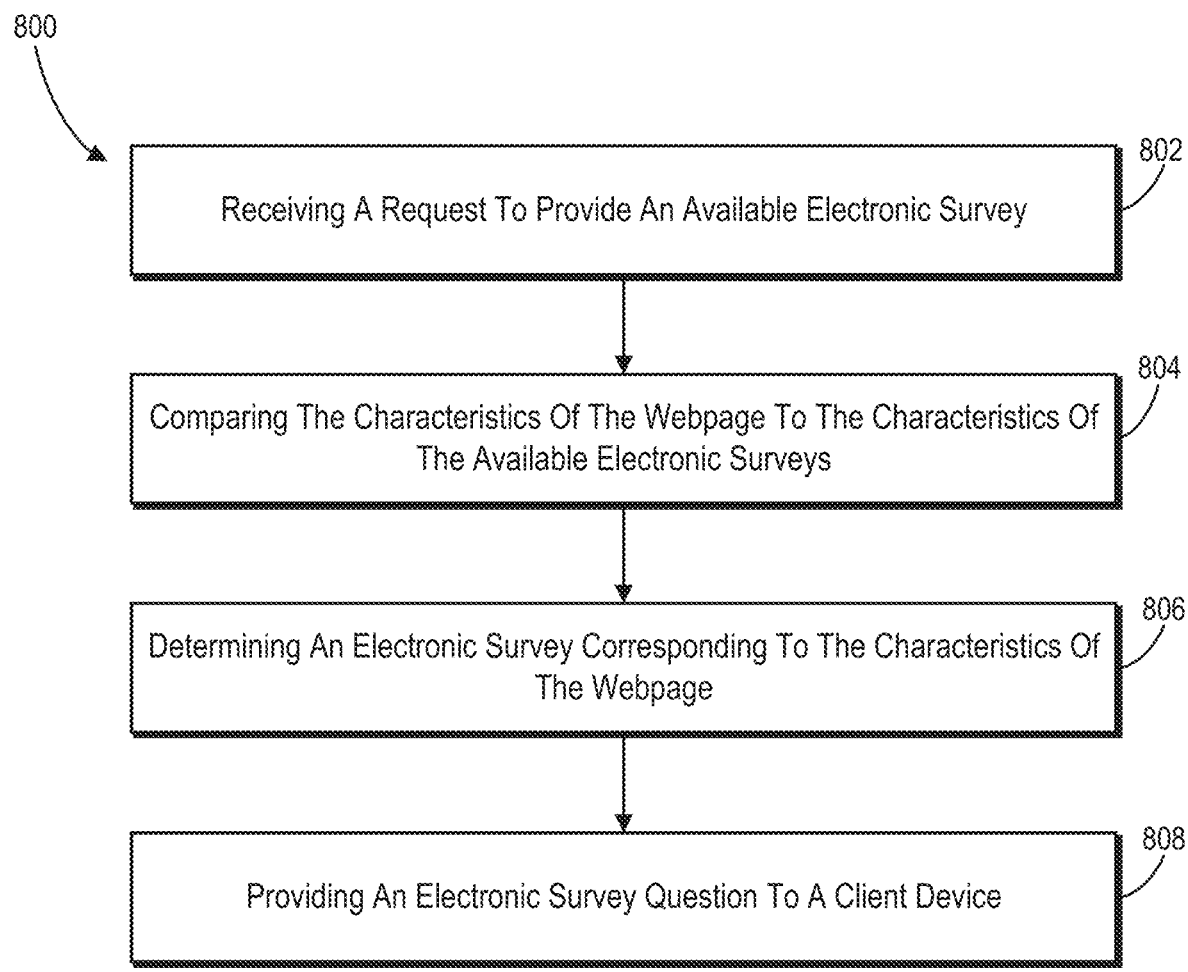
FIG. 8 illustrates another flowchart of a series of acts in another method for distributing an electronic survey via third-party content in accordance with one or more embodiments.

FIGS. 1-6C, the corresponding text, and the examples, provide a number of different systems, devices, and graphical user interfaces for creating and distributing an electronic survey via third-party content. In addition to the foregoing, embodiments disclosed herein also can be described in terms of flowcharts comprising acts and steps in a method for accomplishing a particular result. For example, FIGS. 7-8 illustrate flowcharts of exemplary methods in accordance with one or more embodiments disclosed herein. The methods described in relation to FIGS. 7-8 can be performed with less or more steps/acts or the steps/acts can be performed in differing orders. Additionally, the steps/acts described herein can be repeated or performed in parallel with one another or in parallel with different instances of the same or similar steps/acts.

FIG. 7 illustrates a flowchart of an example method 700 for distributing an electronic survey via third-party content. The method 700 includes an act 702 of determining a characteristic of an electronic survey. For example, act 702 can involve determining the characteristic from a survey distribution profile corresponding to the electronic survey. The survey distribution profile can include one or more preferred third-party content providers for distributing the electronic survey. Alternatively, act 702 can involve analyzing one or more electronic survey questions from the electronic survey to determine a theme of the electronic survey, and assigning the theme as a characteristic of the electronic survey. Additionally, the electronic survey can be generated by a survey administrator associated with an entity that is separate from the third-party content provider.

As part of act 702, or as an additional act, the method 700 can include generating a metadata tag comprising the determined characteristic, and storing the metadata tag with the electronic survey in a survey repository. For example, the survey repository can include a plurality of available electronic surveys associated with a plurality of entities. The method 700 can further include storing a plurality of metadata tags for each available electronic survey, each metadata tag indicating a separate characteristic of the available electronic survey.

The method 700 also includes an act 704 of receiving a request to provide an available electronic survey to the client device. For example, act 704 involves receiving, from a client device associated with a respondent, a request to provide an available electronic survey to the client device within a survey placeholder of a webpage provided to the client device from a third-party content provider. Act 704 can involve receiving the request in an application program interface call from the client device.

The method 700 further includes an act 706 of determining a characteristic of the webpage or the respondent. For example, act 706 involves determining, based on receiving the request, a characteristic of the webpage or a characteristic of the respondent. Act 706 can also involve determining the characteristic of the webpage and the characteristic of the respondent for use in providing the available electronic survey.

Act 706 can involve determining the characteristic of the webpage from metadata included in the request. Act 706 can involve determining the characteristic of the webpage from a database of characteristics mapped to webpages of third-party content providers. Act 706 can involve determining the characteristic of the webpage by analyzing content in the webpage.

Act 706 can involve determining the characteristic of the respondent by identifying demographic information about the respondent based on the request from the client device. For example, act 706 can involve accessing a user profile for the respondent associated with the client device to determine the demographic information.

Additionally, the method 700 includes an act 708 of selecting the electronic survey. For example, act 708 involves selecting the electronic survey from a plurality of available electronic surveys based on the characteristic of the electronic survey corresponding to the characteristic of the webpage or the characteristic of the respondent. Act 708 can involve generating a score for the electronic survey from the plurality of available electronic surveys based on a similarity of the characteristic of the electronic survey to the characteristic of the webpage or the characteristic of the respondent, and selecting, based on the generated score, the electronic survey from the plurality of available electronic surveys.

The method 700 also includes an act 710 of providing an electronic survey question to the client device. For example, act 710 involves providing, to the client device for display within the survey placeholder of the webpage, an electronic survey question from the electronic survey. Act 710 can also involve determining a display characteristic of the survey placeholder of the webpage, and formatting the electronic survey question from the electronic survey according to the determined display characteristic of the survey placeholder. For example, determining the display characteristic of the survey placeholder can involve determining size dimensions for the survey placeholder. Additionally, formatting the electronic survey question from the electronic survey can involve customizing a layout of one or more answers to the electronic survey question.

The method 700 can also include administering the electronic survey within the survey placeholder of the webpage, and receiving, from the client device, a response to the electronic survey question based on a user input to the electronic survey question within the survey placeholder of the webpage. The method 700 can also include updating the electronic survey within the survey placeholder of the webpage in response to the received response from the client device by providing, to the client device for display within the survey placeholder of the webpage, an additional electronic survey question from the electronic survey.

The method 700 can include receiving a plurality of requests to provide a plurality of electronic surveys to the client device within a plurality of survey placeholders of the webpage, selecting a first electronic survey from the plurality of available electronic surveys for a first survey placeholder from the plurality of survey placeholders, and selecting a second electronic survey from the plurality of available electronic surveys for a second survey placeholder from the plurality of survey placeholders.

Furthermore, the method 700 can include determining that the webpage comprises a plurality of survey placeholders at different locations of the webpage, providing, to the client device for display within a first survey placeholder from the plurality of survey placeholders, a first electronic survey question from the electronic survey, and providing, to the client device for display within a second survey placeholder from the plurality of survey placeholders, a second electronic survey question from the electronic survey.

FIG. 8 illustrates a flowchart of an example method 800 for distributing an electronic survey via third-party content. The method 800 includes an act 802 of receiving a request to provide an available electronic survey. For example, act 802 involves receiving, receiving, at an electronic survey system, a request to provide an available electronic survey from a plurality of available electronic surveys, wherein the request comprises one or more characteristics of the webpage.

The method 800 also includes an act 804 of comparing the characteristics of the webpage to the characteristics of the available electronic surveys. For example, act 804 involves comparing the one or more characteristics of the webpage to characteristics associated with each electronic survey of the plurality of available electronic surveys.

As part of act 804, or as an additional act, the method 800 can include determining demographic information of the respondent based on the request further comprising one or more characteristics of the respondent. The method 800 can also include comparing the demographic information of the respondent to target audience information associated with each electronic survey of the plurality of available electronic surveys.

As part of act 804, or as an additional act, the method 800 can include determining a theme of the webpage based on the one or more characteristics of the webpage. For example, comparing the one or more characteristics of the webpage to characteristics associated with each electronic survey of the plurality of available electronic surveys comprises comparing the theme of the webpage to characteristics associated with each electronic survey of the plurality of available electronic surveys.

The method 800 further includes an act 806 of determining an electronic survey corresponding to the characteristics of the webpage. For example, act 806 involves, based on the comparison, determining an electronic survey from the plurality of available electronic surveys that corresponds to the one or more characteristics of the webpage. Act 806 can involve determining the electronic survey from the plurality of available electronic surveys based on the comparison of the demographic information of the respondent to the target audience information.

The method 800 also includes an act 808 of providing an electronic survey question to a client device. For example, act 808 involves providing, to a client device associated with a respondent, an electronic survey question from the electronic survey within a survey placeholder of the webpage. Act 808 can further involve determining size dimensions of the survey placeholder of the webpage, and customizing a layout of the electronic survey question based on the size dimensions of the survey placeholder.

The method 800 can include administering the electronic survey within the survey placeholder of the webpage. For example, administering the electronic survey can involve receiving, from the client device, a response to the electronic survey question in response to the respondent providing user input within the survey placeholder of the webpage with respect to the electronic survey question, selecting an additional electronic survey question from the electronic survey, and providing, to the client device, the additional electronic survey question from the electronic survey within the survey placeholder of the webpage.

Figure 9:
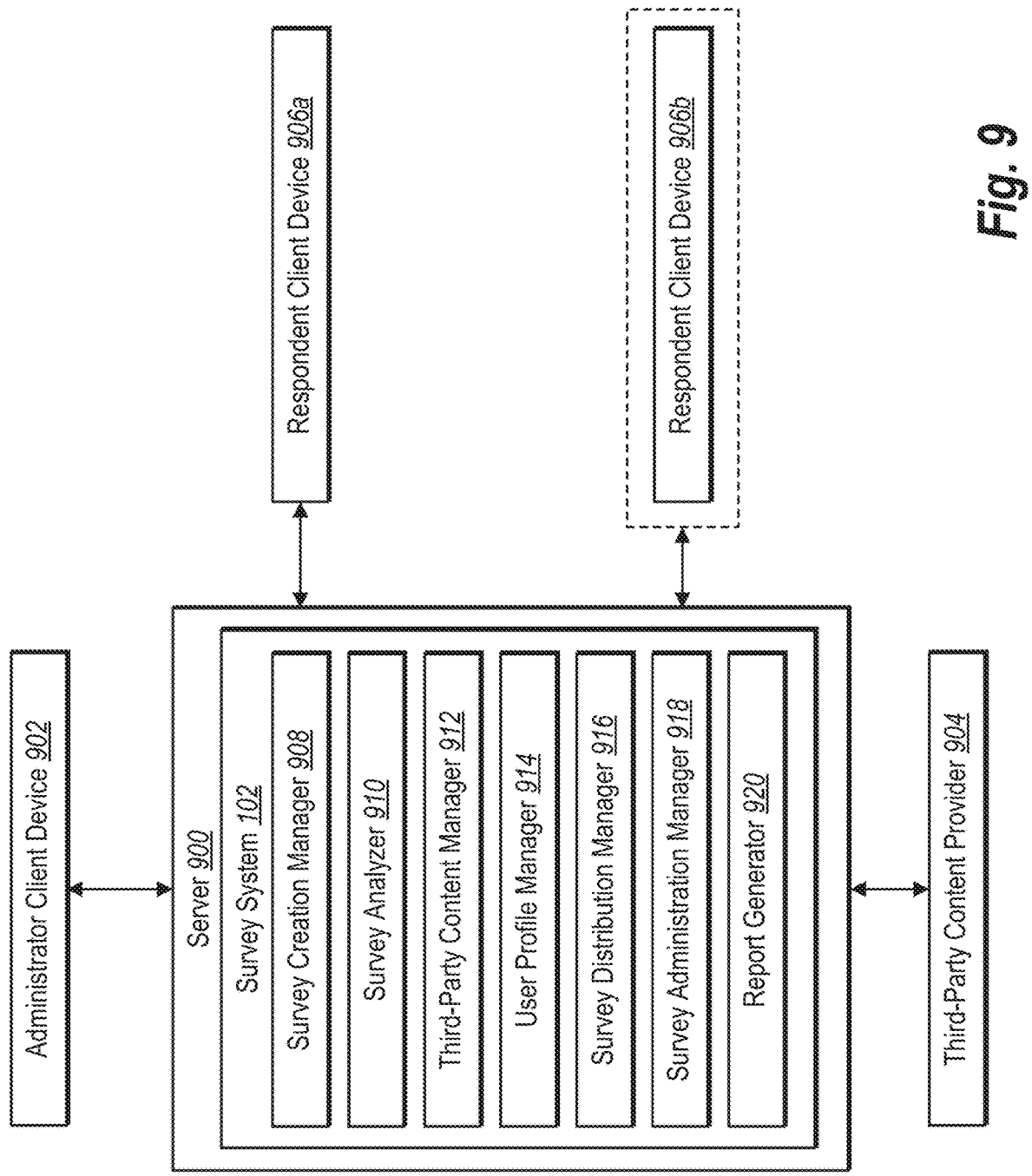
FIG. 9 illustrates a block diagram of the environment of FIG. 1 in which a survey system operates in accordance with one or more embodiments.

FIG. 9 illustrates an example embodiment of an environment that includes the survey system 102 of FIG. 1. Specifically, the survey system 102 operates on a server 900. Specifically, the server 900 communicates with a plurality of devices (administrator client device 902, third-party content provider 904, and respondent client devices 906*a*, 906*b*). The survey system 102 includes a survey creation manager 908, a survey analyzer 910, a third-party content manager 912, a user profile manager 914, a survey distribution manager 916, a survey administration manager 918, and a survey report manager 920. Although the survey system is depicted as having various components, the survey system 102 may have any number of additional or alternative components. Alternatively, one or more components of the survey system 102 may be combined into fewer components or divided into more components. Additionally, although FIG. 9 illustrates the survey system 102 on a single server, the survey system 102 may be on any number of server devices.

In one or more embodiments, each of the components and subcomponents of the survey system 102 can be in communication with one another using any suitable communication technologies. It will be recognized that although the subcomponents of the survey system 102 are shown to be separate in FIG. 9, any of the subcomponents may be combined into fewer components, such as into a single component, or divided into more components as may serve a particular implementation. Furthermore, although the components of FIG. 9 are described in connection with the survey system 102, at least some of the components for performing operations in conjunction with the survey system 102 described herein may be implemented on other devices and/or with other systems.

The components of the survey system 102 can include software, hardware, or both. For example, the components of the survey system 102 (e.g., the survey creation manager 908, the survey analyzer 910, the third-party content manager 912, the user profile manager 914, the survey distribution manager 916, and the survey administration manager 918) can include one or more instructions stored on computer-readable storage mediums and executable by processors of one or more computing devices. When executed by the one or more processors, the computer-executable instructions of the survey system 102 can cause the computing device(s) to perform the survey creation and administration processes described herein. Alternatively, the components of the survey system 102 can comprise hardware, such as a special purpose processing device to perform a certain function or group of functions. Additionally, the components of the survey system 102 can comprise a combination of computer-executable instructions and hardware.

Furthermore, the components of the survey system 102 performing the functions described herein with respect to survey creation and administration may, for example, be implemented as part of a stand-alone application, as a module of an application, as part of a suite of applications, as a plug-in for applications including content creation applications, as a library function or functions that may be called by other applications, and/or as a cloud-computing model. Thus, various components of the survey system 102 may be implemented as part of a stand-alone application on a personal computing device or a mobile device. For example, the components of the survey system 102 may be implemented in any application that allows the creation and administration of surveys to users, as may serve a particular embodiment.

As illustrated, the survey system 102 includes a survey creation manager 908. The survey creation manager 908 manages the creation of a survey, including the composition of one or more survey questions. For example, the survey creation manager 908 receives information from the administrator client device 902 to create a survey. The survey creation manager 908 also receives information from the administrator client device 902 to create one or more survey questions for the survey. To illustrate, the survey creation manager 908 can receive information that a user (e.g., a survey creator or administrator) enters into an administrator application, as previously mentioned.

Additionally, the survey creation manager 908 can assist a user in creating a survey by providing tools to the user to select various template questions, question types, and/or response types. For example, the survey creation manager 908 can manage the appearance and content of an administrator application provided to the administrator client device 902. To illustrate, the survey creation manager 908 can provide a user interface that allows an administrator to manage an order of questions in a survey, including establishing whether the order of questions branches based on responses to the questions.

The survey creation manager 908 can also provide other features to assist a user in the creation and composition of survey questions to present to respondents. For instance, the survey creation manager 908 may provide alternative wording for questions provided by the user. Further, the survey creation manager 908 can allow the user to preview the set of survey questions as if a respondent was viewing the survey on the respondent's client device, as well as edit a survey that the user is creating or has previously created.

The survey creation manager 908 may also allow a user to specify preferences and/or parameters for one or more surveys. In particular, the survey creation manager 908 can allow a user to specify a beginning date of a survey, a survey's duration, and/or when the survey expires. Thus, the survey creation manager 908 can allow the user to specify the availability of the survey to one or more respondents. The survey creation manager 908 can also enable a user to specify how long a respondent has to complete a survey. Additionally, the survey creation manager 908 can allow a user to enter bids for distributing a survey to one or more third-party content providers.

The survey system 102 also includes a survey analyzer 910 for analyzing the content of surveys to determine characteristics of the surveys. Specifically, the survey analyzer 910 can analyze one or more questions of a survey to determine a content of the one or more questions. For example, the survey analyzer 910 can analyze the question (s) using natural language analyzes or keyword analysis to determine a theme or subject matter of the survey. Additionally, the survey analyzer 910 can determine additional characteristics of a survey including, but not limited to, the number of questions in the survey, question types, a time limit assigned to the survey, and other information associated with the survey.

The survey system 102 further includes a third-party content manager 912 that manages information associated with third-party content providers. For example, the third-party content manager 912 can maintain a database of information including a plurality of web sites/webpages associated with a plurality of third-party content providers. To illustrate, the third-party content manager 912 can maintain a mapping of webpages to characteristics associated with the webpages. The third-party content manager 912 can determine the characteristics associated with the webpages from the third-party content providers or by performing an independent analysis of the content of the webpages.

The survey system 102 also includes a user profile manager 914 to manage and store user profile information for a plurality of respondents. Specifically, the user profile manager 914 maintains user profiles including information about a plurality of respondents. For example, the user profile manager 914 can manage a plurality of user profiles for a plurality of respondents who have registered with a survey service and/or opted into receiving surveys by downloading an application associated with the survey system 102. The user profile manager 914 can obtain the profile information based on information that the respondents provide to the survey system 102 (e.g., via a registration website or within a survey application). The user profile manager 914 may also obtain profile information from respondent client devices in connection with requests for available surveys.

In one or more embodiments, a user profile includes user profile information that describes one or more characteristics of the respondent. For example, user profile information can include information about the respondent's geographic location, the respondent's demographics (e.g., sex, race, socioeconomic status, political affiliation), the respondent's name (or other identifier), or other information that may be useful in reporting results of the survey. In at least some examples, user profile information includes device information that the user profile manager 914 obtains from a respondent client device in response to a request to provide a survey to the respondent client device. Thus, the user profile manager 914 can obtain information that describes at least a location and a device type of the respondent client device without requiring the respondent to provide other personal information.

As mentioned, the survey system 102 also includes a survey distribution manager 916. After creating a survey, a user can distribute the survey to a plurality of respondents. When the survey system 102 administers a survey, the survey distribution manager 916 may send the survey to respondents based on requests for available surveys via third-party content. For example, the survey distribution manager 916 can send the survey to respondents who have accessed third-party content (e.g., webpages) associated with third-party content providers. In particular, the survey distribution manager 916 may receive requests to distribute surveys within placeholders at predetermined locations of the webpages.

Additionally, when the survey distribution manager 916 provides a survey to a respondent client device, the survey distribution manager 916 can select the survey based on information received from the survey analyzer 910, third-party content manager 912, and the user profile manager 914. Specifically, the survey distribution manager 916 can use characteristics about the available surveys, third-part content, and potential respondents to select surveys that are likely to be relevant to the respondents. For example, the survey distribution manager 916 can compare the characteristics of the surveys to characteristics of webpages and/or respondents by accessing stored information for surveys (e.g., survey distribution profiles), a database of information associated with third-party content providers, and user profiles. The survey distribution manager 916 can also use bids (e.g., surveys from a highest bidder) from a plurality of different entities to determine whether to provide surveys with third-party content.

The survey system 102 also includes a survey administration manager 918 that facilitates the administration of surveys within third-party content. In particular, administering surveys within third-party content allows the respondents to provide responses to survey questions within the third-party content and without redirecting the respondents to a separate website or interface hosted by the administrator or the survey system 102. The survey administration manager 918 can administer surveys within third-party content by formatting the surveys to fit within the survey placeholders. Formatting the surveys can include setting size dimensions or other display characteristics (e.g., color scheme, look and feel) of the survey questions to correspond to display characteristics of the survey placeholders.

The survey administration manager 918 also collects response information from respondents for surveys administered via third-party content. The survey administration manager 918 can receive information from respondent client devices as respondents interact with surveys. Additionally, the survey administration manager 918 can store the response information and use the response information to update user profiles. The survey administration manager 918 can also use the response information to administer a dynamic survey (e.g., by providing additional questions based on responses to previous questions in the same survey).

The survey system 102 further includes a report generator 920 for generating reports based on received response data. Specifically, a survey creator, an administrator, or other user may want to view a summary of response data for an event. The report generator 920 receives a request to generate a report and communicates with the survey administration manager 918 to generate the report using the response data. To illustrate, the report generator 920 can generate one or more visualizations of the response data that allows a user to identify the different responses across different third-party content providers and subsets of respondents. To generate a visualization, the report generator 920 obtains a plurality of response data point sets and plots the response data point sets to a graph for the user to view. Thus, a user can view how the survey performs on different third-party websites to determine whether to continue including the survey at a specific website.

Additionally, the report generator 920 can communicate with the user profile manager 914 to obtain profile information for respondents who provided response data for the event. For example, the report generator 920 determines a user identifier associated with a response data point set and accesses a user profile based on the user identifier. The report generator 920 can identify user profile information relevant to the request to generate a report. To illustrate, the report generator 920 can determine whether the respondent has a specific characteristic in response to a request by a user to generate a report for respondents with the specific characteristic. The report generator 920 then generates a report with response data for only those respondents having the selected characteristic.

Alternatively, the report generator 920 can generate a dynamic report that allows a user to change the characteristics without requesting a new report. In particular, when generating a report, the report generator 920 can obtain user profile information of a respondent associated with a response data set and insert the user profile information into metadata of the report. When the user wants to view response data for respondents with a specific characteristic, the user can select the desired characteristic and the report will update with the corresponding response data.

As described herein, each of the components of the survey system 102 can communicate with one or more storage devices of the server 900 to store data associated with events, including surveys, survey questions, response data, user profiles, content, and reports. For example, the components of the survey system 102 can communicate with a storage device as described in more detail below in FIG. 10. The components of the survey system 102 can also communicate with storage device(s) to retrieve previously stored data.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred, or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 10:
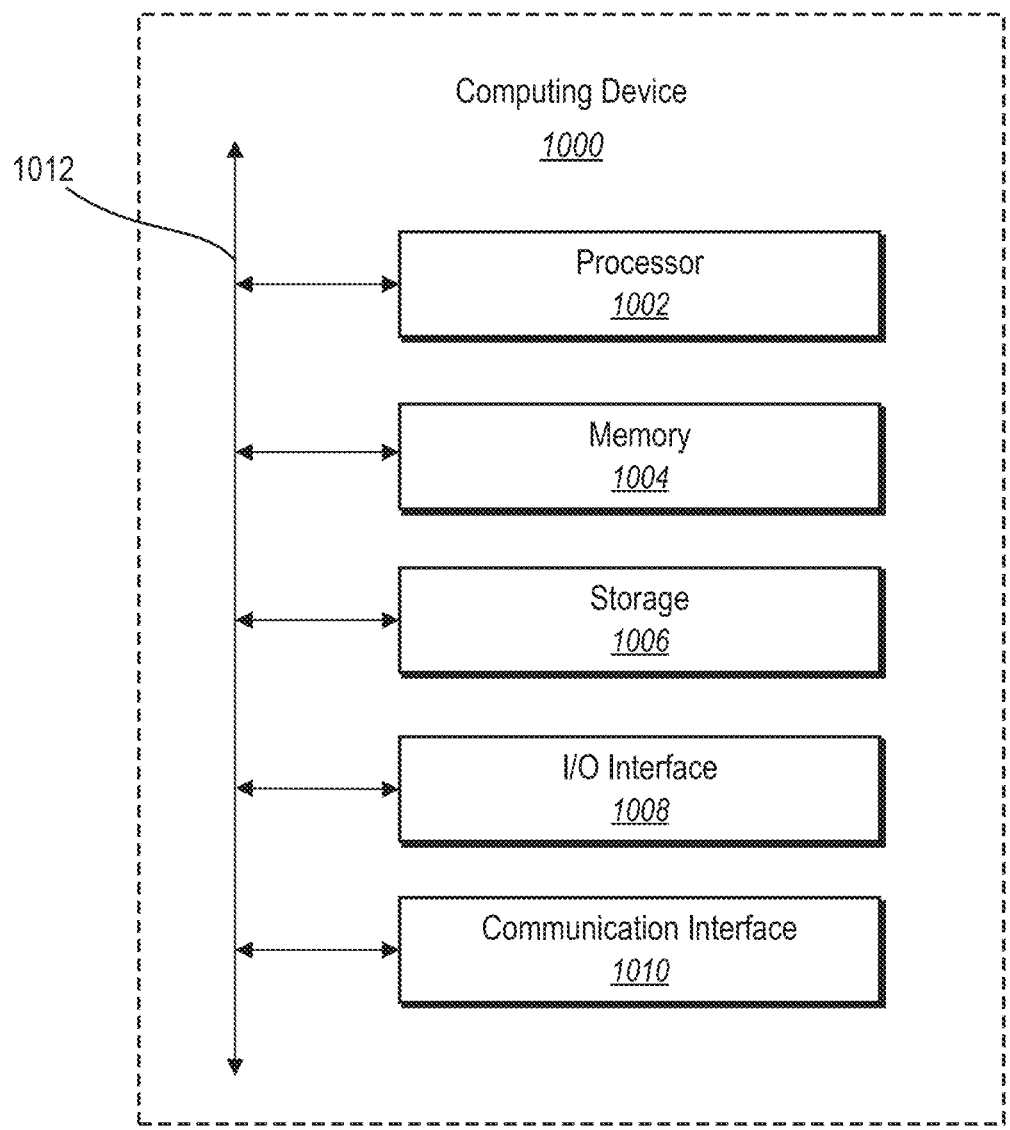
FIG. 10 illustrates a block diagram of a computing device in accordance with one or more embodiments.

FIG. 10 illustrates a block diagram of exemplary computing device 1000 that may be configured to perform one or more of the processes described above. One will appreciate that one or more computing devices such as the computing device 1000 may implement the various devices of the environment 100 of FIG. 1. As shown by FIG. 10, the computing device 1000 can comprise a processor 1002, a memory 1004, a storage device 1006, an I/O interface 1008, and a communication interface 1010, which may be communicatively coupled by way of a communication infrastructure 1012. While an exemplary computing device 1000 is shown in FIG. 10, the components illustrated in FIG. 10 are not intended to be limiting. Additional or alternative components may be used in other embodiments. Furthermore, in certain embodiments, the computing device 1000 can include fewer components than those shown in FIG. 10. Components of the computing device 1000 shown in FIG. 10 will now be described in additional detail.

In one or more embodiments, the processor 1002 includes hardware for executing instructions, such as those making up a computer program. As an example, and not by way of limitation, to execute instructions, the processor 1002 may retrieve (or fetch) the instructions from an internal register, an internal cache, the memory 1004, or the storage device 1006 and decode and execute them. In one or more embodiments, the processor 1002 may include one or more internal caches for data, instructions, or addresses. As an example, and not by way of limitation, the processor 1002 may include one or more instruction caches, one or more data caches, and one or more translation lookaside buffers (TLBs). Instructions in the instruction caches may be copies of instructions in the memory 1004 or the storage 1006.

The memory 1004 may be used for storing data, metadata, and programs for execution by the processor(s). The memory 1004 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1004 may be internal or distributed memory.

The storage device 1006 includes storage for storing data or instructions. As an example and not by way of limitation, storage device 1006 can comprise a non-transitory storage medium described above. The storage device 1006 may include a hard disk drive (HDD), a floppy disk drive, flash memory, an optical disc, a magneto-optical disc, magnetic tape, or a Universal Serial Bus (USB) drive or a combination of two or more of these. The storage device 1006 may include removable or non-removable (or fixed) media, where appropriate. The storage device 1006 may be internal or external to the computing device 1000. In one or more embodiments, the storage device 1006 is non-volatile, solid-state memory. In other embodiments, the storage device 1006 includes read-only memory (ROM). Where appropriate, this ROM may be mask programmed ROM, programmable ROM (PROM), erasable PROM (EPROM), electrically erasable PROM (EEPROM), electrically alterable ROM (EAROM), or flash memory or a combination of two or more of these.

The I/O interface 1008 allows a user to provide input to, receive output from, and otherwise transfer data to and receive data from computing device 1000. The I/O interface 1008 may include a mouse, a keypad or a keyboard, a touch screen, a camera, an optical scanner, network interface, modem, other known I/O devices or a combination of such I/O interfaces. The I/O interface 1008 may include one or more devices for presenting output to a user, including, but not limited to, a graphics engine, a display (e.g., a display screen), one or more output drivers (e.g., display drivers), one or more audio speakers, and one or more audio drivers. In certain embodiments, the I/O interface 1008 is configured to provide graphical data to a display for presentation to a user. The graphical data may be representative of one or more graphical user interfaces and/or any other graphical content as may serve a particular implementation.

The communication interface 1010 can include hardware, software, or both. In any event, the communication interface 1010 can provide one or more interfaces for communication (such as, for example, packet-based communication) between the computing device 1000 and one or more other computing devices or networks. As an example, and not by way of limitation, the communication interface 1010 may include a network interface controller (NIC) or network adapter for communicating with an Ethernet or other wire-based network or a wireless NIC (WNIC) or wireless adapter for communicating with a wireless network, such as a WI-FI.

Additionally, or alternatively, the communication interface 1010 may facilitate communications with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the communication interface 1010 may facilitate communications with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination thereof.

Additionally, the communication interface 1010 may facilitate communications various communication protocols. Examples of communication protocols that may be used include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), radio frequency ("RF") signaling technologies, Long Term Evolution ("LTE") technologies, wireless communication technologies, in-band and out-of-band signaling technologies, and other suitable communications networks and technologies.

The communication infrastructure 1012 may include hardware, software, or both that couples components of the computing device 1000 to each other. As an example and not by way of limitation, the communication infrastructure 1012 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination thereof.

Figure 11:
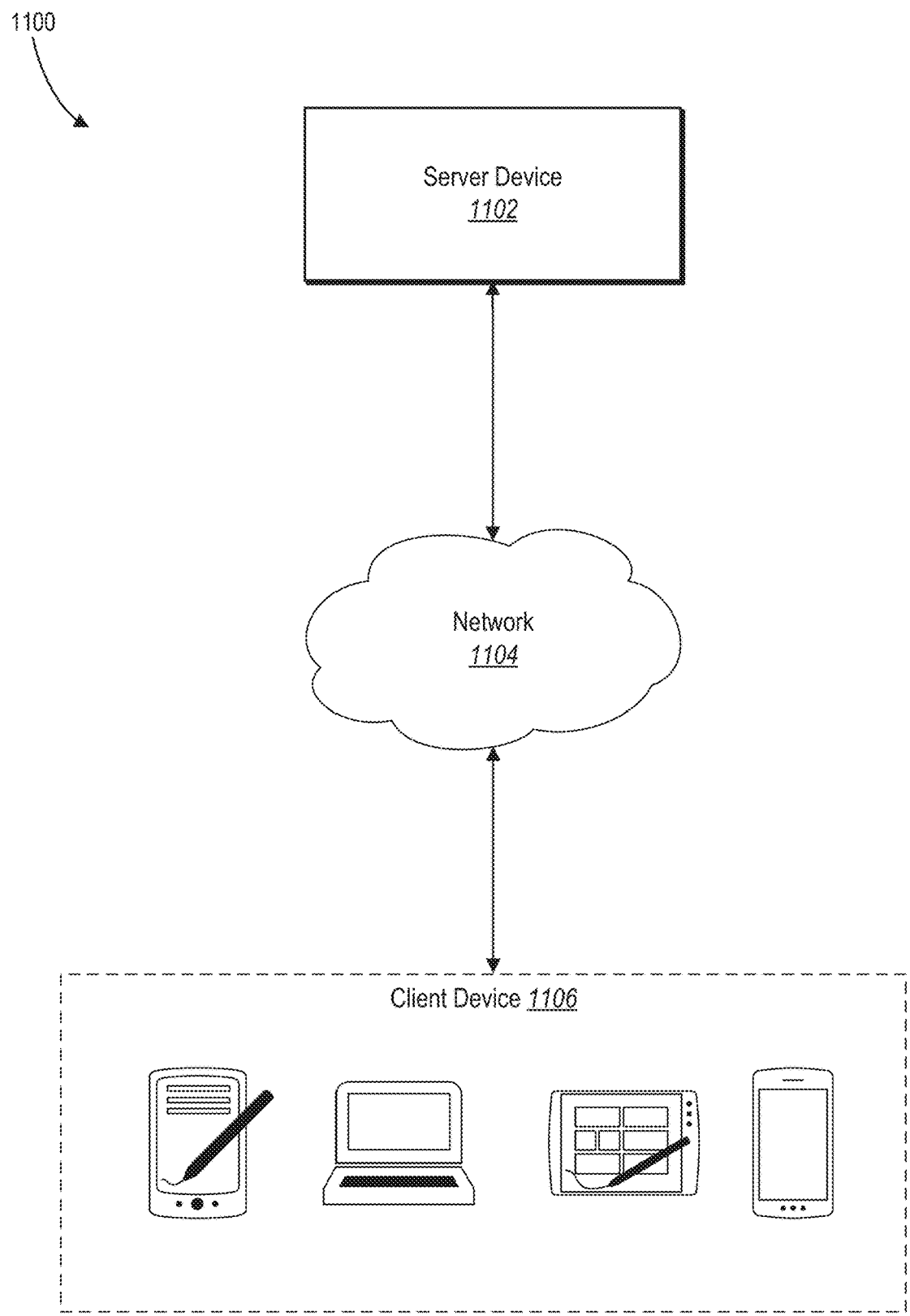
FIG. 11 illustrates a networking environment of a survey system in accordance with one or more embodiments.

FIG. 11 illustrates an example network environment 1100 for a survey system 102. Network environment 1100 includes a client device 1106, and a server device 1102 connected to each other by a network 1104. Although FIG. 11 illustrates a particular arrangement of client device 1106, server device 1102, and network 1104, this disclosure contemplates any suitable arrangement of client device 1106, server device 1102, and network 1104. As an example, and not by way of limitation, two or more of client device 1106, and server device 1102 may be connected to each other directly, bypassing network 1104. As another example, two or more of client device 1106 and server device 1102 may be physically or logically co-located with each other in whole, or in part. Moreover, although FIG. 11 illustrates a particular number of client devices 1106, server devices 1102, and networks 1104, this disclosure contemplates any suitable number of client devices 1106, server devices 1102, and networks 1104. As an example, and not by way of limitation, network environment 1100 may include multiple client devices 1106, server devices 1102, and networks 1104.

This disclosure contemplates any suitable network 1104. As an example, and not by way of limitation, one or more portions of network 1104 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 1104 may include one or more networks 1104.

Links may connect client device 1106, and server device 1102 to communication network 1104 or to each other. This disclosure contemplates any suitable links. In particular embodiments, one or more links include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link, or a combination of two or more such links. Links need not necessarily be the same throughout network environment 1100. One or more first links may differ in one or more respects from one or more second links.

In particular embodiments, client device 1106 may be an electronic device including hardware, software, or embedded logic components or a combination of two or more such components and capable of carrying out the appropriate functionalities implemented or supported by client device 1106. As an example, and not by way of limitation, a client device 1106 may include any of the computing devices discussed above in relation to FIG. 10. A client device 1106 may enable a network user at client device 1106 to access network 1104. A client device 1106 may enable its user to communicate with other users at other client devices or systems.

In particular embodiments, client device 1106 may include a web browser, such as MICROSOFT INTERNET EXPLORER, GOOGLE CHROME, or MOZILLA FIREFOX, and may have one or more add-ons, plug-ins, or other extensions, such as TOOLBAR or YAHOO TOOLBAR. A user at client device 1106 may enter a Uniform Resource Locator (URL) or other address directing the web browser to a particular server (such as server, or a server associated with a third-party system), and the web browser may generate a Hyper Text Transfer Protocol (HTTP) request and communicate the HTTP request to server. The server may accept the HTTP request and communicate to client device 1106 one or more Hyper Text Markup Language (HTML) files responsive to the HTTP request. Client device 1106 may render a webpage based on the HTML files from the server for presentation to the user. This disclosure contemplates any suitable webpage files. As an example, and not by way of limitation, webpages may render from HTML files, Extensible Hyper Text Markup Language (XHTML) files, or Extensible Markup Language (XML) files, according to particular needs. Such pages may also execute scripts such as, for example and without limitation, those written in JAVASCRIPT, JAVA, MICROSOFT SILVERLIGHT, combinations of markup language and scripts such as AJAX (Asynchronous JAVASCRIPT and XML), and the like. Herein, reference to a webpage encompasses one or more corresponding webpage files (which a browser may use to render the webpage) and vice versa, where appropriate.

In particular embodiments, server device 1102 may include a variety of servers, sub-systems, programs, modules, logs, and data stores. In particular embodiments, server device 1102 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. Server device 1102 may also include suitable components such as network interfaces, security mechanisms, load balancers, failover servers, management-and-network-operations consoles, other suitable components, or any suitable combination thereof.

In particular embodiments, server device 1102 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific The foregoing specification is described with reference to specific exemplary embodiments thereof. Various embodiments and aspects of the disclosure are described with reference to details discussed herein, and the accompanying drawings illustrate the various embodiments. The description above and drawings are illustrative and are not to be construed as limiting. Numerous specific details are described to provide a thorough understanding of various embodiments.

The additional or alternative embodiments may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

We claim:

1. A method comprising:
   determining, by a survey system, a characteristic of an electronic survey;
   receiving, at the survey system and from a client device associated with a respondent, a request to provide an available electronic survey to the client device within a survey placeholder of a webpage provided to the client device from a third-party content provider system, the third-party content provider system being different from the survey system, wherein the survey placeholder comprises a designated graphical area within the webpage for displaying and administering the available electronic survey to the respondent;
   determining, by the survey system and based on receiving the request, a characteristic of the webpage or a characteristic of the respondent;
   selecting, by the survey system, the electronic survey from a plurality of available electronic surveys by determining that the electronic survey shares a common characteristic with the webpage or the respondent based on the characteristic of the electronic survey corresponding to the characteristic of the webpage or the characteristic of the respondent; and
   providing, from the survey system and to the client device for display within the survey placeholder of the webpage, an electronic survey question from the electronic survey by formatting the electronic survey question according to display characteristics of the survey placeholder of the webpage.

2. The method as recited in claim 1, further comprising receiving, at the survey system and from the client device, a response to the electronic survey question in response to the respondent providing user input with respect to the electronic survey question within the survey placeholder of the webpage.

3. The method as recited in claim 2, further comprising, in response to the received response, updating the survey placeholder of the webpage by providing an additional electronic survey question from the electronic survey for display within the survey placeholder of the webpage.

4. The method as recited in claim 1, further comprising:
   generating a metadata tag comprising the determined characteristic of the electronic survey; and
   associating the metadata tag with the electronic survey in a survey repository.

5. The method as recited in claim 1, wherein determining the characteristic of the electronic survey comprises determining the characteristic from a survey distribution profile corresponding to the electronic survey.

6. The method as recited in claim 1, wherein determining the characteristic of the electronic survey comprises:
   analyzing one or more electronic survey questions from the electronic survey to determine a theme of the electronic survey; and
   assigning the theme as a characteristic of the electronic survey.

7. The method as recited in claim 1, wherein providing the electronic survey question from the electronic survey for display within the survey placeholder of the webpage, comprises:

determining the display characteristics of the survey placeholder; and formatting the electronic survey question from the electronic survey according to the display characteristics of the survey placeholder by determining a number of electronic survey questions from the electronic survey to display within the survey placeholder according to the display characteristics.

8. The method as recited in claim 1, wherein providing the electronic survey question from the electronic survey for display within the survey placeholder of the webpage comprises:

determining the display characteristic of the survey placeholder by determining size dimensions for the survey placeholder; and formatting the electronic survey question from the electronic survey by customizing a layout of one or more answer options to the electronic survey question within the survey placeholder.

9. The method as recited in claim 1, wherein:

receiving a request to provide an available electronic survey to the client device within the survey placeholder comprises receiving a plurality of requests to provide a plurality of electronic surveys to the client device within a plurality of survey placeholders of the webpage; and selecting the electronic survey from a plurality of available electronic surveys comprises:

selecting a first electronic survey from the plurality of available electronic surveys for a first survey placeholder from the plurality of survey placeholders; and selecting a second electronic survey from the plurality of available electronic surveys for a second survey placeholder from the plurality of survey placeholders.

10. The method as recited in claim 1, further comprising:

determining that the webpage comprises a plurality of survey placeholders at different locations within the webpage;

providing, to the client device for display within a first survey placeholder from the plurality of survey placeholders, a first electronic survey question from the electronic survey; and providing, to the client device for display within a second survey placeholder from the plurality of survey placeholders, a second electronic survey question from the electronic survey.

11. The method as recited in claim 1, wherein selecting the electronic survey from the plurality of available electronic surveys comprises:

generating a score for the electronic survey from the plurality of available electronic surveys based on a similarity of the characteristic of the electronic survey to the characteristic of the webpage or the characteristic of the respondent; and selecting, based on the generated score indicating that the electronic survey shares the common characteristic with the webpage or the respondent, the electronic survey from the plurality of available electronic surveys.

12. The method as recited in claim 1, wherein the electronic survey is generated by a survey administrator associated with an entity that is separate from the third-party content provider.

13. A non-transitory computer readable storage media storing instructions thereon that, when executed by at least one processor, cause a computing device to:

receive, at an electronic survey system, a request to provide an available electronic survey from a plurality of available electronic surveys to a client device within a survey placeholder of a webpage provided to the client device from a third-party content provider system, wherein the request comprises one or more characteristics of the webpage, wherein the survey placeholder comprises a designated graphical area within the webpage for displaying and administering the available electronic survey to a respondent;

comparing, by the electronic survey system, the one or more characteristics of the webpage to characteristics associated with each electronic survey of the plurality of available electronic surveys;

based on the comparison, determining an electronic survey from the plurality of available electronic surveys that corresponds to the one or more characteristics of the webpage by determining that the electronic survey shares a common characteristic with the webpage; and providing, by the survey system and to a client device associated with a respondent, an electronic survey question from the electronic survey within the survey placeholder of the webpage by formatting the electronic survey question according to display characteristics of the survey placeholder of the webpage.

14. The non-transitory computer readable storage media as recited in claim 13, further comprising instructions that, when executed by at least one processor, cause the computing device to administer the electronic survey within the survey placeholder of the webpage, wherein administering the electronic survey comprises:

receiving, from the client device, a response to the electronic survey question in response to the respondent providing user input within the survey placeholder of the webpage with respect to the electronic survey question;

selecting an additional electronic survey question from the electronic survey; and providing, to the client device, the additional electronic survey question from the electronic survey within the survey placeholder of the webpage.

15. The non-transitory computer readable storage media as recited in claim 13, further comprising instructions that, when executed by at least one processor, cause the computing device to:

determine a theme of the webpage based on the one or more characteristics of the webpage; and wherein comparing the one or more characteristics of the webpage to characteristics associated with each electronic survey of the plurality of available electronic surveys comprises comparing the theme of the webpage to characteristics associated with each electronic survey of the plurality of available electronic surveys.

16. The non-transitory computer readable storage media as recited in claim 13, further comprising instructions that, when executed by at least one processor, cause the computing device to:

determine demographic information of the respondent based on the request further comprising one or more characteristics of the respondent;

compare the demographic information of the respondent to target audience information associated with each electronic survey of the plurality of available electronic surveys; and wherein determining the electronic survey from the plurality of available electronic surveys is further based on the comparison of the demographic information of the respondent to the target audience information.

17. The non-transitory computer readable storage media as recited in claim 13, wherein formatting the electronic survey question according to the display characteristics of the survey placeholder of the webpage comprises:
    determining size dimensions of the survey placeholder of the webpage; and
    customizing a layout of the electronic survey question based on the size dimensions of the survey placeholder.

18. A system comprising:
    at least one processor; and
    a non-transitory computer readable storage medium comprising instructions that, when executed by the at least one processor, cause the system to:
        determine, by a survey system, a characteristic of an electronic survey;
        receive, at the survey system and from a client device associated with a respondent, a request to provide an available electronic survey to the client device within a survey placeholder of a webpage provided to the client device from a third-party content provider system, the third-party content provider system being different from the survey system, wherein the survey placeholder comprises a designated graphical area within the webpage for displaying and administering the available electronic survey to the respondent;
        determine, by the survey system and based on receiving the request, a characteristic of the webpage or a characteristic of the respondent;
        select, by the survey system, the electronic survey from a plurality of available electronic surveys by determining that the electronic survey shares a common characteristic with the webpage or the respondent based on the characteristic of the electronic survey corresponding to the characteristic of the webpage or the characteristic of the respondent; and
        provide, from the survey system to the client device for display within the survey placeholder of the webpage, an electronic survey question from the electronic survey by formatting the electronic survey question according to display characteristics of the survey placeholder of the webpage.

19. The system as recited in claim 18, further comprising instructions that, when executed by the at least one processor, cause the system to:
    determine size dimensions of the survey placeholder of the webpage;
    determine a plurality of electronic survey questions from the electronic survey that fit within the size dimensions of the survey placeholder; and
    wherein the instructions that cause the system to provide the electronic survey question further cause the system to provide the plurality of electronic survey questions within the survey placeholder of the webpage.

20. The system as recited in claim 18, wherein the instructions that cause the system to provide the electronic survey further cause the system to:
    determine that the survey placeholder of the webpage is not large enough to fit a question prompt and an answer option format associated with the electronic survey question; and
    modify the answer option format associated with the electronic question to be compatible with the display characteristics of the survey placeholder of the webpage.

* * * * *